(12) United States Patent
Li et al.

(10) Patent No.: US 11,627,168 B2
(45) Date of Patent: *Apr. 11, 2023

(54) METHOD, RELATED APPARATUS, AND SYSTEM FOR RECOVERING CALLED SERVICE OF TERMINAL

(71) Applicant: Huawei Technologies Co., Ltd., Shenzhen (CN)

(72) Inventors: He Li, Shenzhen (CN); Jinzhou Ye, Shenzhen (CN); Ridong Xu, Dongguan (CN); Biao Zhang, Shenzhen (CN); Shufeng Shi, Xi'an (CN); Boqiang Luo, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 38 days.

This patent is subject to a terminal disclaimer.

(21) Appl. No.: 17/214,540

(22) Filed: Mar. 26, 2021

(65) Prior Publication Data

US 2021/0218781 A1    Jul. 15, 2021

Related U.S. Application Data

(63) Continuation of application No. 16/455,749, filed on Jun. 28, 2019, now Pat. No. 11,005,899, which is a
(Continued)

(30) Foreign Application Priority Data

Aug. 7, 2013   (CN) .......................... 201310342761.0

(51) Int. Cl.
*H04L 65/1069* (2022.01)
*H04L 41/0668* (2022.01)
(Continued)

(52) U.S. Cl.
CPC ...... *H04L 65/1069* (2013.01); *H04L 12/1407* (2013.01); *H04L 41/0668* (2013.01);
(Continued)

(58) Field of Classification Search
CPC ............. H04L 65/1069; H04L 12/1407; H04L 41/0668; H04L 65/00; H04L 65/1016;
(Continued)

(56) References Cited

U.S. PATENT DOCUMENTS 8,316,457 B1 * 11/2012 Paczkowski ........ H04L 65/1046
726/28
8,335,487 B2 * 12/2012 Wen ...................... H04L 9/3271
455/410
(Continued)

FOREIGN PATENT DOCUMENTS

CN          1905472 A       1/2007
CN        101127722 A       2/2008
(Continued)

OTHER PUBLICATIONS

U.S. Appl. No. 16/455,749, filed Jun. 28, 2019.
(Continued)

*Primary Examiner* — Michael J Moore, Jr.
(74) *Attorney, Agent, or Firm* — Leydig, Voit & Mayer, Ltd.

(57) ABSTRACT

A method, a related apparatus, and a system for recovering a called service of a terminal are provided. The method includes: when a called request of a user terminal is received, querying an initial proxy-call session control function (P-CSCF) entity with which the user terminal currently registers; if it is detected that the initial P-CSCF is faulty, selecting an available P-CSCF and sending, to the available P-CSCF, a notification message that carries a redundancy identifier, where the redundancy identifier is used to instruct
(Continued)

S401 — Receive a registration triggering request that is sent by a policy and charging rules function PCRF entity and carries a user name S402 — Trigger a user terminal indicated by the user name to re-register with a P-CSCF to bear a called service of the user terminal the available P-CSCF to trigger the user terminal to re-register with the P-CSCF; and when a registration complete message sent by the P-CSCF with which the user terminal re-registers is received, delivering the called request to the re-registered P-CSCF to bear a called service of the user terminal.

23 Claims, 11 Drawing Sheets

Related U.S. Application Data continuation of application No. 16/146,813, filed on Sep. 28, 2018, now Pat. No. 10,735,480, which is a continuation of application No. 15/827,959, filed on Nov. 30, 2017, now Pat. No. 10,142,376, which is a continuation of application No. 15/015,008, filed on Feb. 3, 2016, now Pat. No. 9,894,110, which is a continuation of application No. PCT/CN2014/081582, filed on Jul. 3, 2014.

(51) Int. Cl.
| | | |
|---|---|---|
| H04L 65/1073 | (2022.01) | |
| H04L 69/40 | (2022.01) | |
| H04L 65/00 | (2022.01) | |
| H04L 12/14 | (2006.01) | |
| H04L 65/1016 | (2022.01) | |
| H04L 43/10 | (2022.01) | |
| H04L 41/0893 | (2022.01) | |
| H04L 65/1046 | (2022.01) | |

(52) U.S. Cl.
CPC .......... *H04L 65/00* (2013.01); *H04L 65/1016* (2013.01); *H04L 65/1073* (2013.01); *H04L 69/40* (2013.01); *H04L 41/0893* (2013.01); *H04L 43/10* (2013.01); *H04L 65/1046* (2013.01)

(58) Field of Classification Search
CPC . H04L 65/1073; H04L 69/40; H04L 41/0893; H04L 43/10; H04L 65/1046
See application file for complete search history.

(56) References Cited

U.S. PATENT DOCUMENTS

| | | | | |
|---|---|---|---|---|
| 8,438,257 | B2* | 5/2013 | Belinchon | H04L 69/40 709/221 |
| 8,873,386 | B2* | 10/2014 | Tuffin | H04L 65/1073 370/242 |
| 9,894,110 | B2* | 2/2018 | Li | H04L 65/1073 |
| 10,142,376 | B2* | 11/2018 | Li | H04L 65/1016 |
| 10,735,480 | B2* | 8/2020 | Li | H04L 65/1016 |
| 11,005,899 | B2* | 5/2021 | Li | H04L 65/1073 |
| 2008/0069050 | A1* | 3/2008 | Dutta | H04W 12/062 370/331 |
| 2008/0175157 | A1* | 7/2008 | Lim | H04L 69/40 370/242 |
| 2008/0182575 | A1* | 7/2008 | Torres | H04W 24/04 455/435.1 |
| 2009/0191869 | A1* | 7/2009 | Siegel | H04W 60/06 455/435.1 |
| 2009/0215454 | A1* | 8/2009 | Przybysz | H04L 65/1073 455/435.1 |
| 2010/0040047 | A1* | 2/2010 | Castellanos Zamora | H04L 65/1043 370/352 |
| 2010/0154029 | A1* | 6/2010 | Fernandez Alonso | H04L 65/1101 726/1 |
| 2010/0165833 | A1 | 7/2010 | Du et al. | |
| 2010/0217855 | A1* | 8/2010 | Przybysz | H04W 28/16 709/227 |
| 2010/0229027 | A1* | 9/2010 | Belinchon | H04L 69/40 714/E11.073 |
| 2011/0128843 | A1* | 6/2011 | Przybysz | H04L 65/1016 370/216 |
| 2011/0296489 | A1* | 12/2011 | Fernandez Alonso | H04L 63/08 726/1 |
| 2012/0042084 | A1* | 2/2012 | Dutta | H04L 67/1004 709/228 |
| 2012/0131167 | A1* | 5/2012 | Shen | H04L 65/1016 709/223 |
| 2012/0237014 | A1 | 9/2012 | Gregorat et al. | |
| 2013/0010804 | A1* | 1/2013 | Fernandez Alonso | H04L 65/104 370/428 |
| 2013/0100863 | A1* | 4/2013 | Guerra | H04M 15/81 370/259 |
| 2013/0142084 | A1* | 6/2013 | Tokunaga | H04L 65/1045 370/259 |
| 2013/0250750 | A1 | 9/2013 | Nishida et al. | |
| 2013/0279406 | A1* | 10/2013 | Merino Vazquez | H04L 65/1016 370/328 |
| 2014/0341085 | A1* | 11/2014 | Suryavanshi | H04L 65/1063 370/260 |
| 2015/0016420 | A1* | 1/2015 | Balabhadruni | H04L 65/1016 370/331 |
| 2015/0124588 | A1* | 5/2015 | Hallenstal | H04L 65/1046 370/221 |
| 2015/0181033 | A1* | 6/2015 | Keller | H04L 65/1036 455/404.1 |
| 2015/0264629 | A1* | 9/2015 | Rasanen | H04L 67/306 455/456.1 |
| 2015/0282242 | A1* | 10/2015 | Merino Vazquez | H04W 76/19 370/221 |
| 2016/0156678 | A1* | 6/2016 | Li | H04L 65/1069 370/352 |
| 2016/0380802 | A1* | 12/2016 | Kunz | H04L 65/1073 370/216 |

FOREIGN PATENT DOCUMENTS

| | | | | |
|---|---|---|---|---|
| CN | 101212814 | A | 7/2008 | |
| CN | 101217407 | A | 7/2008 | |
| CN | 101426261 | A | 5/2009 | |
| CN | 101489242 | A | 7/2009 | |
| CN | 101489245 | A | 7/2009 | |
| CN | 102316435 | A | 1/2012 | |
| CN | 103078846 | A | 5/2013 | |
| CN | 103441862 | A | 12/2013 | |
| EP | 1914937 | A1 | 4/2008 | |
| EP | 1988662 | A1 | 11/2008 | |
| EP | 2372966 | A1 | 10/2011 | |
| EP | 2456159 | A1 * | 5/2012 | ......... H04L 65/1016 |
| EP | 2928142 | B1 | 9/2017 | |
| WO | WO-2007112621 | A1 * | 10/2007 | ....... H04L 29/12188 |
| WO | WO-2012000350 | A1 * | 1/2012 | ............. H04W 8/12 |
| WO | WO-2013067907 | A1 * | 5/2013 | ............. H04W 4/02 |
| WO | 2013174413 | A1 | 11/2013 | |

OTHER PUBLICATIONS

U.S. Appl. No. 16/146,813, filed Sep. 28, 2018.
U.S. Appl. No. 15/827,959, filed Nov. 30, 2017.
U.S. Appl. No. 15/015,008, filed Feb. 3, 2016.
"3rd Generation Partnership Project; Technical Specification Group Core Network and Terminals; IMS Restoration Procedures (Release 9)," 3GPP TS 23.380 V9.0.0, pp. 1-13, 3rd Generation Partnership Project, Valbonne, France (Dec. 2009).
"New alternative for P-CSCF failure," 3GPP TSG CT WG4 Meeting #62bis, Porto Portugal, C4-131843, 3rd Generation Partnership Project, Valbonne, France (Oct. 11, 2013).

(56) References Cited

OTHER PUBLICATIONS

"3rd Generation Partnership Project; Technical Specification Group Core Network and Terminals; IMS Restoration Procedures (Release 11)," 3GPP TS 23.380 V11.1.0, XP050691254, pp. 1-17, 3rd Generation Partnership Project, Valbonne, France (Dec. 2012).

"3rd Generation Partnership Project; Technical Specification Group Core Network and Terminals; IP multimedia call control protocol based on Session Initiation Protocol (SIP) and Session Description Protocol (SDP); Stage 3 (Release 12)," 3GPP TS 24.229 V12.1.0, pp. 1-798, 3rd Generation Partnership Project, Valbonne, France (Jun. 2013).

"3rd Generation Partnership Project; Technical Specification Group Core Network and Terminals; Cx and Dx interfaces based on the Diameter protocol; Protocol details(Release 11)," 3GPP TS 29.229 V11.4.0, pp. 1-37, 3rd Generation Partnership Project, Valbonne, France (Jun. 2013).

"3rd Generation Partnership Project; Technical Specification Group Core Network and Terminals; IP Multimedia (IM) Subsystem Cx and Dx interfaces; Signalling flows and message contents (Release 11)," 3GPP TS 29.228, V11.8.0, pp. 1-73, 3rd Generation Partnership Project, Valbonne, France (Jun. 2013).

"3rd Generation Partnership Project;Technical Specification Group Core Network and Terminals; Study on IMS Restoration Procedures (Release 9)," 3GPP TR 23.820 V9.0.0, pp. 1-43 ,3rd Generation Partnership Project, Valbonne, France (Sep. 2009).

"Discussion on P-CSCF failure with PMIP based S5 issue," 3GPP TSG CT WG4 Meeting #56, Xiamen, P.R. China, TD 34-120269, 3rd Generation Partnership Project, Valbonne, France (Feb. 6-10, 2012).

"3rd Generation Partnership Project; Technical Specification Group Core Network and Terminals; IMS Restoration Procedures(Release 11)," 3GPP TS 23.380 V11.1.019 , XP050691254, pp. 1-18, 3rd Generation Partnership Project-Valbonne, France (Dec. 2012).

"3rd Generation Partnership Project; Technical Specification Group Core Network and Terminals; Policy and Charging Control signalling flows and Quality of Service (QoS) parameter mapping (Release 11)," 3GPP TS 29.213 V11.7.0, total 194 pages, 3rd Generation Partnership Project, Valbonne, France (Jun. 2013).

"3rd Generation Partnership Project; Technical Specification Group Core Network and Terminals; Policy and Charging Control over Rx reference point (Release 11)," 3GPP TS 29.214 V11.8.0, total 54 pages, 3rd Generation Partnership Project, Valbonne, France (Mar. 2013).

"3rd Generation Partnership Project; Technical Specification Group Services and System Aspects; General Packet Radio Service (GPRS) enhancements for Evolved Universal Terrestrial Radio Access Network (E-UTRAN) access (Release 12)," 3GPP TS 23.401 V12.1 0, total 291 pages, 3rd Generation Partnership Project, Valbonne, France (Jun. 2013).

\* cited by examiner

METHOD, RELATED APPARATUS, AND SYSTEM FOR RECOVERING CALLED SERVICE OF TERMINAL

CROSS-REFERENCE TO RELATED APPLICATIONS

This application is a continuation of U.S. patent application Ser. No. 16/455,749, filed on Jun. 28, 2019, which is a continuation of U.S. patent application Ser. No. 16/146,813, filed on Sep. 28, 2018, now U.S. Pat. No. 10,735,480, which is a continuation of U.S. patent application Ser. No. 15/827,959, filed on Nov. 30, 2017, now U.S. Pat. No. 10,142,376, which is a continuation of U.S. patent application Ser. No. 15/015,008, filed on Feb. 3, 2016, now U.S. Pat. No. 9,894,110, which is a continuation of International Patent Application No. PCT/CN2014/081582, filed on Jul. 3, 2014, which claims priority to Chinese Patent Application No. 201310342761.0, filed on Aug. 7, 2013. All of the aforementioned patent applications are hereby incorporated by reference in their entireties.

TECHNICAL FIELD

Embodiments of the present disclosure relate to the field of communications technologies, and in particular, to a method, a related apparatus, and a system for recovering a called service of a terminal.

BACKGROUND

A CSCF (Call Session Control Function) is a functional entity in an IP multimedia subsystem (IMS), and is mainly responsible for processing signaling control in a multimedia call session process. The CSCF may be classified into a P-CSCF (Proxy CSCF), an I-CSCF (Interrogating CSCF), and an S-CSCF (Serving CSCF).

In a service control process, if the P-CSCF is faulty, and if a user terminal that registers with the P-CSCF is used as a called party, and the S-CSCF finds the P-SCCF fault when managing a called service, a user of the terminal cannot be contacted by using the P-CSCF, which causes a service failure.

In the prior art, two P-CSCFs form primary and secondary P-CSCFs, and when one P-CSCF is faulty, a service may be taken over by the secondary P-CSCF. A same IP address IP1 is configured for a P-CSCF1 and a P-CSCF2. Generally, the P-CSCF1 advertises a route of the P-CSCF1 to the outside, but the P-CSCF2 does not advertise an address of the P-CSCF2. First, the user terminal sends a registration request to the IP1 and registers with the primary P-CSCF1, and the P-CSCF1 backs up user registration information in the secondary P-CSCF2. When the P-CSCF1 is faulty, the P-CSCF2 can sense, by means of heartbeats, that the P-CSCF1 is faulty. In this case, the P-CSCF2 advertises a route of the P-CSCF2 to the outside, and then a service of the terminal is routed to the P-CSCF2 for processing. Because user information has been backed up during previous registration, the new P-CSCF2 can correctly process a request of the user.

In the prior art, main disadvantages of a data backup solution between primary and secondary network elements include: heartbeat detection is performed between a primary network element and a secondary network element, which is prone to a dual-host fault, causing a problem that neither the primary network element nor the secondary network element can perform a service. In addition, the primary network element and the secondary network element present a same IP to the outside, which requires support from a near-end router, where processing is relatively complex.

SUMMARY

A technical problem to be resolved in embodiments of the present disclosure is to provide a method, a related apparatus, and a system for recovering a called service of a terminal, which can quickly recover a called service of a user terminal when a P-CSCF is faulty.

According to a first aspect, the embodiments of the present disclosure provide a method for recovering a called service of a terminal, including:

when a called request of a user terminal is received, querying an initial proxy-call session control function P-CSCF entity with which the user terminal currently registers; and if it is detected that the initial P-CSCF is faulty, selecting an available P-CSCF and sending a notification message to the available P-CSCF to trigger the user terminal to re-register with the P-CSCF, where the available P-CSCF triggers, by using a policy and charging rules function PCRF entity, the user terminal to re-register with the P-CSCF.

In a first possible implementation manner of the first aspect, the sending a notification message to the available P-CSCF to trigger the user terminal to re-register with the P-CSCF includes:

sending, to the available P-CSCF, a notification message that carries a redundancy identifier, where the redundancy identifier is used to instruct the available P-SCCF to trigger the user terminal to re-register with the P-CSCF.

In a second possible implementation manner of the first aspect, the sending a notification message to the available P-CSCF to trigger the user terminal to re-register with the P-CSCF includes:

sending the called request of the user terminal to the available P-CSCF; and when the available P-CSCF determines that no registration data of a called user is stored, triggering the user terminal to re-initiate IMS registration. According to a second aspect, the embodiments of the present disclosure further provide another method for recovering a called service of a terminal, including: receiving a notification message that is sent by a serving-call session control function S-CSCF entity and carries a user name;

generating, if it is found, by means of parsing, that the notification message further includes a redundancy identifier, a reselection request that carries a P-CSCF re-select flag and the user name; and sending the reselection request to a policy and charging rules function PCRF entity that manages a user terminal indicated by the user name, so that the PCRF instructs, according to the P-CSCF re-select flag, the user terminal indicated by the user name to reselect a P-CSCF to bear a called service of the user terminal, where the notification message that carries the redundancy identifier is generated by the S-CSCF when a P-CSCF with which the user terminal corresponding to a received called request registers is faulty, and the redundancy identifier is used to instruct to trigger the user terminal to re-register with a P-CSCF.

With reference to the second aspect, in a first possible implementation manner, the sending the reselection request to a policy and charging rules function PCRF entity that manages a user terminal indicated by the user name includes:

sending the reselection request to a Diameter routing agent DRA, so that the DRA sends, according to the user name in the reselection request, the reselection request to the PCRF that manages the user terminal indicated by the user name.

With reference to the second aspect or the first possible implementation manner of the second aspect, in a second possible implementation manner, before the generating, if it is found, by means of parsing, that the notification message further includes a redundancy identifier, a reselection request that carries a P-CSCF re-select flag and the user name, the method further includes:

determining whether the user terminal indicated by the user name registers with a local end; and if the user terminal does not register with the local end, performing the generating, if it is found, by means of parsing, that the notification message further includes a redundancy identifier, a reselection request that carries a P-CSCF re-select flag and the user name.

With reference to the second aspect, or the first possible implementation manner of the second aspect, or the second possible implementation manner of the second aspect, in a third possible implementation manner, the method further includes:

when a registration request of the user terminal is received, sending a registration complete message to an S-CSCF to which the user terminal belongs, to complete registration of the user terminal.

According to a third aspect, the embodiments of the present disclosure further provide still another method for recovering a called service of a terminal, including:

generating a registration triggering request when a reselection request that is sent by a P-CSCF and carries a P-CSCF re-select flag and a user name is received; and sending the generated registration triggering request to a gateway connected to a user terminal indicated by the user name, so that the gateway triggers the user terminal indicated by the user name to re-register with a P-CSCF to bear a called service of the user terminal, where the reselection request is generated by the P-CSCF according to a notification message that is sent by an S-CSCF and carries the user name and a redundancy identifier, where the redundancy identifier is used to instruct to trigger the user terminal indicated by the user name to re-register with the P-CSCF.

With reference to the third aspect, in a first possible implementation manner, the generating a registration triggering request when a reselection request that is sent by a P-CSCF and carries a P-CSCF re-select flag and a user name is received includes:

when the reselection request that is sent by the P-CSCF and carries the P-CSCF re-select flag and the user name is received, generating a registration triggering request that carries a session release message, where the session release message is used to instruct the gateway connected to the user terminal indicated by the user name to request a mobility management entity MME to delete a user bearer of a user terminal.

With reference to the third aspect, in a second possible implementation manner, the generating a registration triggering request when a reselection request that is sent by a P-CSCF and carries a P-CSCF re-select flag and a user name is received includes:

when the reselection request that is sent by the P-CSCF and carries the P-CSCF re-select flag and the user name is received, generating a registration triggering request that carries update P-CSCF address information, where the update P-CSCF address information is used to instruct the gateway connected to the user terminal indicated by the user name to generate a list of available P-CSCF addresses and send the list of the available P-CSCF addresses to the user terminal indicated by the user name.

According to a fourth aspect, the embodiments of the present disclosure further provide yet another method for recovering a called service of a terminal, including:

when a registration triggering request that is sent by a policy and charging rules function PCRF entity and carries a user name is received, triggering a user terminal indicated by the user name to re-register with a P-CSCF to bear a called service of the user terminal, where the registration triggering request is generated when the PCRF receives a reselection request that is sent by a P-CSCF and carries a P-CSCF re-select flag and the user name, and the reselection request is generated by the P-CSCF according to a notification message that is sent by an S-CSCF and carries the user name and a redundancy identifier, where the redundancy identifier is used to instruct to trigger the user terminal indicated by the user name to re-register with the P-CSCF.

With reference to the fourth aspect, in a first possible implementation manner, the triggering a user terminal indicated by the user name to re-register with a P-CSCF includes:

when the registration triggering request carries a session release message, sending, to a mobility management entity MME, a release request that carries the user name, so that the MME deletes a user bearer of the user terminal indicated by the user name; or when the registration triggering request carries update P-CSCF address information, acquiring a list of available P-CSCF addresses and sending the list of the available P-CSCF addresses to the user terminal indicated by the user name, so that the user terminal selects a P-CSCF from the list of the available P-CSCF addresses and registers with the selected P-CSCF.

According to a fifth aspect, the embodiments of the present disclosure further provide yet another method for recovering a called service of a terminal, including:

when an access failure is detected, initiating a registration request for registering with a P-CSCF, so that a re-registered P-CSCF bears a called service when an initial P-CSCF is faulty; and when a list of available P-CSCF addresses that is sent by a gateway is received, selecting a P-CSCF from the list of the available P-CSCF addresses and registering with the selected P-CSCF, so that the re-registered P-CSCF bears the called service when the initial P-CSCF is faulty.

With reference to the fifth aspect, in a first possible implementation manner, the selecting a P-CSCF from the list of the available P-CSCF addresses and registering with the selected P-CSCF, when a list of available P-CSCF addresses that is sent by a gateway is received includes:

when the list of the available P-CSCF addresses that is sent by the gateway is received, determining whether the list of the available P-CSCF addresses includes a host name of the initial P-CSCF with which a user terminal currently registers; and if the list of the available P-CSCF addresses does not include the host name of the initial P-CSCF, selecting the P-CSCF from the list of the available P-CSCF addresses and registering with the selected P-CSCF.

According to a sixth aspect, the embodiments of the present disclosure provide an apparatus for recovering a called service of a terminal, including:

a querying module, configured to: when a called request of a user terminal is received, query an initial proxy-call session control function P-CSCF entity with which the user terminal currently registers; and a processing module, configured to: if it is detected that the initial P-CSCF is faulty, select an available P-CSCF and send a notification message to the available P-CSCF to trigger the user terminal to re-register with the P-CSCF, where the available P-CSCF triggers, by using a policy and charging rules function PCRF entity, the user terminal to re-register with the P-CSCF.

With reference to the sixth aspect, in a first possible implementation manner, the processing module is specifically configured to: after selecting the available P-CSCF, send, to the available P-CSCF, the notification message that carries a redundancy identifier, where the redundancy identifier is used to instruct the available P-SCCF to trigger the user terminal to re-register with the P-CSCF.

With reference to the first possible implementation manner of the sixth aspect, in a second possible implementation manner, the processing module is specifically configured to: after selecting the available P-CSCF, send the called request of the user terminal to the available P-CSCF, so as to trigger, when the available P-CSCF determines that no registration data of a called user is stored, the user terminal to re-initiate IMS registration.

According to a seventh aspect, the embodiments of the present disclosure further provide another apparatus for recovering a called service of a terminal, including:

a receiving module, configured to receive a notification message that is sent by a serving-call session control function S-CSCF entity and carries a user name;

a processing module, configured to generate, if it is found, by means of parsing, that the notification message further includes a redundancy identifier, a reselection request that carries a P-CSCF re-select flag and the user name; and a sending module, configured to send the reselection request to a policy and charging rules function PCRF entity that manages a user terminal indicated by the user name, so that the PCRF instructs, according to the P-CSCF re-select flag, the user terminal indicated by the user name to reselect a P-CSCF to bear a called service of the user terminal, where the notification message that carries the redundancy identifier is generated by the S-CSCF when a P-CSCF with which the user terminal corresponding to a received called request registers is faulty, and the redundancy identifier is used to instruct to trigger the user terminal to re-register with a P-CSCF.

With reference to the seventh aspect, in a first possible implementation manner, the sending module is specifically configured to send the reselection request to a Diameter routing agent DRA, so that the DRA sends, according to the user name in the reselection request, the reselection request to the PCRF that manages the user terminal indicated by the user name.

With reference to the seventh aspect or the first possible implementation manner of the seventh aspect, in a second possible implementation manner, the apparatus further includes:

a determining module, configured to: determine whether the user terminal indicated by the user name registers with a local end, and when a result of the determining is that the user terminal does not register with the local end, instruct the processing module to perform the generating, if it is found, by means of parsing, that the notification message further includes a redundancy identifier, a reselection request that carries a P-CSCF re-select flag and the user name.

With reference to the seventh aspect, or the first possible implementation manner of the seventh aspect, or the second possible implementation manner of the seventh aspect, in a third possible implementation manner, the apparatus further includes:

a registering module, configured to: when a registration request of the user terminal is received, send a registration complete message to an S-CSCF to which the user terminal belongs, to complete registration of the user terminal.

According to an eighth aspect, the embodiments of the present disclosure further provide still another apparatus for recovering a called service of a terminal, including:

a generating module, configured to generate a registration triggering request when a reselection request that is sent by a P-CSCF and carries a P-CSCF re-select flag and a user name is received; and a sending module, configured to send the generated registration triggering request to a gateway connected to a user terminal indicated by the user name, so that the gateway triggers the user terminal indicated by the user name to re-register with a P-CSCF to bear a called service of the user terminal, where the reselection request is generated by the P-CSCF according to a notification message that is sent by an S-CSCF and carries the user name and a redundancy identifier, where the redundancy identifier is used to instruct to trigger the user terminal indicated by the user name to re-register with the P-CSCF.

With reference to the eighth aspect, in a first possible implementation manner, the generating module is specifically configured to: when the reselection request that is sent by the P-CSCF and carries the P-CSCF re-select flag and the user name is received, generate a registration triggering request that carries a session release message, where the session release message is used to instruct the gateway connected to the user terminal indicated by the user name to request a mobility management entity MME to delete a user bearer of a user terminal.

With reference to the eighth aspect, in a second possible implementation manner, the generating module is specifically configured to: when the reselection request that is sent by the P-CSCF and carries the P-CSCF re-select flag and the user name is received, generate a registration triggering request that carries update P-CSCF address information, where the update P-CSCF address information is used to instruct the gateway connected to the user terminal indicated by the user name to generate a list of available P-CSCF addresses and send the list of the available P-CSCF addresses to the user terminal indicated by the user name.

According to a ninth aspect, the embodiments of the present disclosure further provide yet another apparatus for recovering a called service of a terminal, including:

a receiving unit, configured to receive a registration triggering request that is sent by a policy and charging rules function PCRF entity and carries a user name; and a triggering module, configured to trigger a user terminal indicated by the user name to re-register with a P-CSCF to bear a called service of the user terminal, where the registration triggering request is generated when the PCRF receives a reselection request that is sent by a P-CSCF and carries a P-CSCF re-select flag and the user name, and the reselection request is generated by the P-CSCF according to a notification message that is sent by an S-CSCF and carries the user name and a redundancy identifier, where the redundancy identifier is used to instruct to trigger the user terminal indicated by the user name to re-register with the P-CSCF.

With reference to the ninth aspect, in a first possible implementation manner, the triggering module includes:

a first sending unit, configured to: when the registration triggering request carries a session release message, send, to a mobility management entity MME, a release request that carries the user name, so that the MME deletes a user bearer of the user terminal indicated by the user name; or a second sending unit, configured to: when the registration triggering request carries update P-CSCF address information, acquire a list of available P-CSCF addresses and send the list of the available P-CSCF addresses to the user terminal indicated by the user name, so that the user terminal selects a P-CSCF from the list of the available P-CSCF addresses and registers with the selected P-CSCF.

According to a tenth aspect, the embodiments of the present disclosure further provide yet another apparatus for recovering a called service of a terminal, including:

a registration initiating module, configured to: when an access failure is detected, initiate a registration request for registering with a P-CSCF, so that a re-registered P-CSCF bears a called service when an initial P-CSCF is faulty; and a registration selection module, configured to: when a list of available P-CSCF addresses that is sent by a gateway is received, select a P-CSCF from the list of the available P-CSCF addresses and register with the selected P-CSCF, so that the re-registered P-CSCF bears the called service when the initial P-CSCF is faulty.

With reference to the tenth aspect, in a first possible implementation manner, the registration selection module includes:

a determining unit, configured to: when the list of the available P-CSCF addresses that is sent by the gateway is received, determine whether the list of the available P-CSCF addresses includes a host name of the initial P-CSCF with which a user terminal currently registers; and a registration selecting unit, configured to: if the list of the available P-CSCF addresses does not include the host name of the initial P-CSCF, select the P-CSCF from the list of the available P-CSCF addresses and register with the selected P-CSCF.

According to an eleventh aspect, the embodiments of the present disclosure further provide a system for recovering a called service of a terminal, including: a serving-call session control function S-CSCF entity, at least two proxy-call session control function P-CSCF entities, and a user terminal, where the at least two P-CSCFs include a second P-CSCF and a first P-CSCF with which the user terminal currently registers; where the S-CSCF is configured to: when a called request of the user terminal is received, query the first P-CSCF with which the user terminal currently registers; and if it is detected that the first P-CSCF is faulty, select the second P-CSCF and send, to the second P-CSCF, a notification message that carries a redundancy identifier, where the redundancy identifier is used to instruct the available P-CSCF to trigger the user terminal to re-register with the P-CSCF;

the second P-CSCF is configured to trigger the user terminal to re-register with the P-CSCF; and the S-CSCF is further configured to: when a registration complete message sent by the P-CSCF with which the user terminal re-registers is received, deliver the called request to the re-registered P-CSCF to bear a called service of the user terminal, where the second P-CSCF specifically triggers, by using a policy and charging rules function PCRF entity, the user terminal to re-register with the P-CSCF.

With reference to the eleventh aspect, in a first possible implementation manner, the system further includes a DNS server;

the S-CSCF is further configured to configure, on the DNS server, a first identifier and a second identifier according to a host name of the first P-CSCF, where the first identifier includes an IP address of the first P-CSCF, and the second identifier includes an IP address of the second P-CSCF.

With reference to the eleventh aspect, or the first possible implementation manner of the eleventh aspect, in a second possible implementation manner, the system further includes a policy and charging rules function PCRF entity;

the second P-CSCF is specifically configured to: generate, according to the notification message that is sent by the S-CSCF and carries a user name and the redundancy identifier, a reselection request that carries a P-CSCF re-select flag and the user name, and send the reselection request to the PCRF; and the PCRF is configured to instruct, according to the P-CSCF re-select flag, the user terminal indicated by the user name to reselect a P-CSCF to bear the called service of the user terminal.

With reference to the second possible implementation manner of the eleventh aspect, in a third possible implementation manner, the system further includes a Diameter routing agent DRA;

the DRA is configured to: receive the reselection request sent by the second P-CSCF, and send the reselection request to the PCRF.

With reference to the second possible implementation manner of the eleventh aspect, or the third possible implementation manner of the eleventh aspect, in a fourth possible implementation manner, the system further includes a gateway connected to the user terminal;

the PCRF is specifically configured to: generate a registration triggering request when the reselection request that is sent by the P-CSCF and carries the P-CSCF re-select flag and the user name is received, and send the registration triggering request to the gateway; and the gateway is configured to trigger, according to the registration triggering request, the user terminal indicated by the user name to re-register with the P-CSCF to bear the called service of the user terminal.

With reference to the fourth possible implementation manner of the eleventh aspect, in a fifth possible implementation manner, the gateway is specifically configured to: when the registration triggering request carries a session release message, send, to a mobility management entity MME, a release request that carries the user name, so that the MME deletes a user bearer of the user terminal indicated by the user name; or when the registration triggering request carries update P-CSCF address information, acquire a list of available P-CSCF addresses and send the list of the available P-CSCF addresses to the user terminal indicated by the user name, so that the user terminal selects a P-CSCF from the list of the available P-CSCF addresses and registers with the selected P-CSCF.

With reference to the fifth possible implementation manner of the eleventh aspect, in a sixth possible implementation manner, the user terminal is further configured to: when an access failure is detected, initiate a registration request for registering with a P-CSCF, so that a re-registered P-CSCF bears the called service when the initial P-CSCF is faulty; or when the list of the available P-CSCF addresses that is sent by the gateway is received, select a P-CSCF from the list of the available P-CSCF addresses and register with the selected P-CSCF, so that the re-registered P-CSCF bears the called service when the initial P-CSCF is faulty.

According to a twelfth aspect, the embodiments of the present disclosure provide a method for recovering a called service of a terminal, including:

receiving a called request of a user terminal;

determining that no registration data of a called user is stored; and sending, to a policy and charging rules function PCRF entity that manages the user terminal, a request for triggering the user terminal to re-initiate IMS registration.

According to a thirteenth aspect, the embodiments of the present disclosure provide an apparatus for recovering a called service of a terminal, including:

a receiving module, configured to receive a called request of a user terminal;

a processing module, configured to: when the receiving module receives the called request, determine that no registration data of a called user is stored; and a sending module, configured to: after the processing module determines that no registration data of the called user is stored, send, to a PCRF that manages the user terminal, a request for triggering the user terminal to re-initiate IMS registration.

In the embodiments of the present disclosure, after a called request is received, if it is detected that a P-CSCF with which a user terminal corresponding to the called request currently registers is faulty, a corresponding message that carries a redundancy identifier is generated to finally trigger the terminal to re-register with a P-CSCF, and a called service of the user terminal is borne in the re-registered P-CSCF, which avoids problems in the prior art that a dual-host fault is caused because heartbeat detection needs to be performed between a primary network element and a secondary network element and processing is complex because a same IP needs to be presented to the outside. In addition, fault recovery can be quickly completed in an existing network architecture.

BRIEF DESCRIPTION OF DRAWINGS

To describe the technical solutions in the embodiments of the present disclosure or in the prior art more clearly, the following briefly introduces the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

When a user performs a called service by using a user terminal, if a P-CSCF with which the user terminal currently registers is faulty, the user terminal is triggered, by using another P-CSCF in a P-CSCF pool (P-CSCF pool), to re-register with a new P-CSCF.

Figure 1:
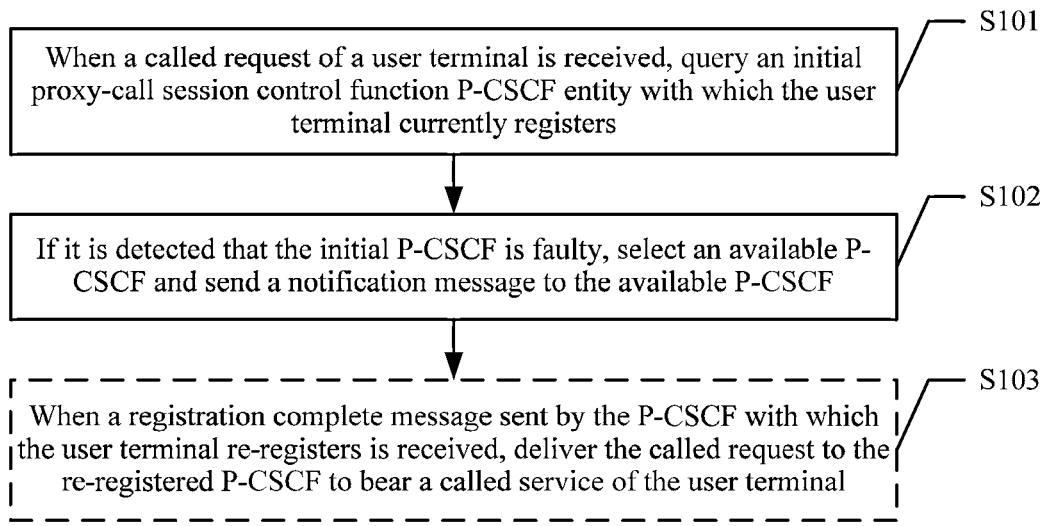
FIG. 1 is a schematic flowchart of Embodiment 1 of a method for recovering a called service of a terminal according to the present disclosure.

Referring to FIG. 1, FIG. 1 is a schematic flowchart of Embodiment 1 of a method for recovering a called service of a terminal according to the present disclosure. The method in this embodiment of the present disclosure may be specifically implemented in an S-CSCF or an IBCF (Interconnection Border Control Function). Specifically, the method in this embodiment of the present disclosure includes the following steps:

S101: When a called request of a user terminal is received, query an initial proxy-call session control function P-CSCF entity with which the user terminal currently registers.

After the user terminal registers with a P-CSCF, the P-CSCF sends corresponding registration complete information to an S-CSCF, and the S-CSCF performs authentication and performs processing such as registering a user name of the user terminal and a host name of the P-CSCF with which the user terminal registers. Therefore, according to a user name of the user terminal corresponding to the called request, the S-CSCF may query and determine the initial P-CSCF with which the user terminal currently registers. The user name of the user terminal is used to identify the user terminal, and may be specifically an IP address, a user service permission, other user configuration information, and the like of the user terminal.

S102: If it is detected that the initial P-CSCF is faulty, select an available P-CSCF and send a notification message to the available P-CSCF to trigger the user terminal to re-register with the P-CSCF.

The S-CSCF may specifically perform heartbeat detection on each P-CSCF in a current P-CSCF pool by using a heartbeat mechanism, and determine, according to data of the heartbeat detection or according to whether heartbeat data can be normally received, whether the initial P-CSCF with which the user terminal currently registers is faulty. For example, it may be determined that the initial P-CSCF is faulty when a ping command (a command used to check whether a network is good or a network connection speed) has no response or a detection message fails to be received or sent.

The notification message may be sent to the available P-CSCF in either of the following manners, so as to achieve an objective of triggering the user terminal to re-register with the P-CSCF:

Manner 1: Send, to the available P-CSCF, a notification message that carries a redundancy identifier, where the redundancy identifier is used to instruct the available P-SCCF to trigger the user terminal to re-register with the P-CSCF;

Manner 2: Send the called request of the user terminal to the available P-CSCF; and when the available P-CSCF determines that no registration data of a called user is stored, trigger the user terminal to re-initiate IMS registration. In Manner 2, the notification message is specifically the called request. Optionally, when the available P-CSCF determines that the available P-CSCF does not store the registration data of the called user, the user terminal is triggered to re-initiate the IMS registration. The called user is a user who uses the user terminal and is called.

It should be noted that the triggering the user terminal to re-register with the P-CSCF refers to triggering the user terminal to re-initiate the IMS registration.

When it is detected that the initial P-CSCF is faulty, an available P-CSCF is selected from the current P-CSCF pool. The available P-CSCF may be a P-CSCF that is determined, by means of heartbeat detection or other manners, to be not faulty.

Specifically, in this embodiment of the present disclosure, two identifiers, that is, a first identifier and a second identifier, may be preconfigured for the initial P-CSCF, where the first identifier includes an IP address of the initial P-CSCF, and the second identifier includes an IP address of a P-CSCF except the initial P-CSCF. The first identifier is an IP address advertised by the initial P-CSCF, and the second identifier is an IP address of another P-CSCF (which corresponds to the available P-CSCF in S102), except the initial P-CSCF, in the P-CSCF pool. When it is detected in S102 that the initial P-CSCF is faulty, the notification message may be directly sent to the available P-CSCF according to the configured second identifier.

The configuring two identifiers for the initial P-CSCF may be specifically configuring, on a DNS (Domain Name System) server, the first identifier and the second identifier according to a host name of the initial P-CSCF.

S102 may specifically include: acquiring the first identifier and the second identifier that are configured for the initial P-CSCF, which may be specifically querying on the DNS server by using the host name of the initial P-CSCF, to acquire the first identifier and the second identifier; if it is detected, according to the acquired first identifier, that the initial P-CSCF corresponding to the first identifier is faulty, using a P-CSCF corresponding to the second identifier as the available P-CSCF, for example, if a heartbeat message is sent by using the first identifier and no response message is normally received, it may be determined that the initial P-CSCF corresponding to the first identifier is faulty; and sending the notification message to the available P-CSCF according to the second identifier. That is, the notification message is sent according to the configured second identifier. It should be noted that the notification message further carries the user name of the user terminal, so that the available P-CSCF initiates, according to the user name, a procedure of triggering the user terminal to re-register with the P-CS CF.

S103. Optionally, when a registration complete message sent by the P-CSCF with which the user terminal re-registers is received, deliver the called request to the re-registered P-CSCF to bear a called service of the user terminal, where the available P-CSCF triggers, by using a policy and charging rules function PCRF (Policy and Charging Rules Function) entity, the user terminal to re-register with the P-CSCF.

The available P-CSCF may learn, according to the redundancy identifier in the notification message, that the current P-CSCF with which the user terminal registers is faulty, and initiate the procedure of triggering the user terminal to re-register with the P-CSCF. Specifically, the available P-CSCF may instruct, by using the policy and charging rules function PCRF entity that manages the user terminal and by using a path of a gateway connected to the user terminal, the user terminal to re-register with a new P-CSCF, so that the S-CSCF delivers the called request to the new P-CSCF, and the new P-CSCF bears the called service of the user terminal. The available P-CSCF may alternatively determine, when receiving the called request of the user terminal and when determining that the available P-CSCF does not store the registration data of the called user, that the current P-CSCF with which the user terminal registers is faulty, and need to initiate the procedure of triggering the user terminal to re-register with the P-CSCF.

Further, the delivering the called request to the re-registered P-CSCF to bear a called service of the user terminal includes: sending the called request to the re-registered P-CSCF, so that the re-registered P-CSCF sends the called request to the user terminal to perform the called service. That is, the S-CSCF sends the called request to the re-registered P-CSCF, and then the re-registered P-CSCF sends the called request to the user terminal to complete the called service.

In this embodiment of the present disclosure, after a called request is received, if it is detected that a P-CSCF with which a user terminal corresponding to the called request currently registers is faulty, a corresponding message that carries a redundancy identifier is generated to finally trigger the terminal to re-register with a P-CSCF, and a called service of the user terminal is borne in the re-registered P-CSCF, which avoids problems in the prior art that a dual-host fault is caused because heartbeat detection needs to be performed between a primary network element and a secondary network element and processing is complex because a same IP needs to be presented to the outside. In addition, fault recovery can be quickly completed in an existing network architecture.

Figure 2A:
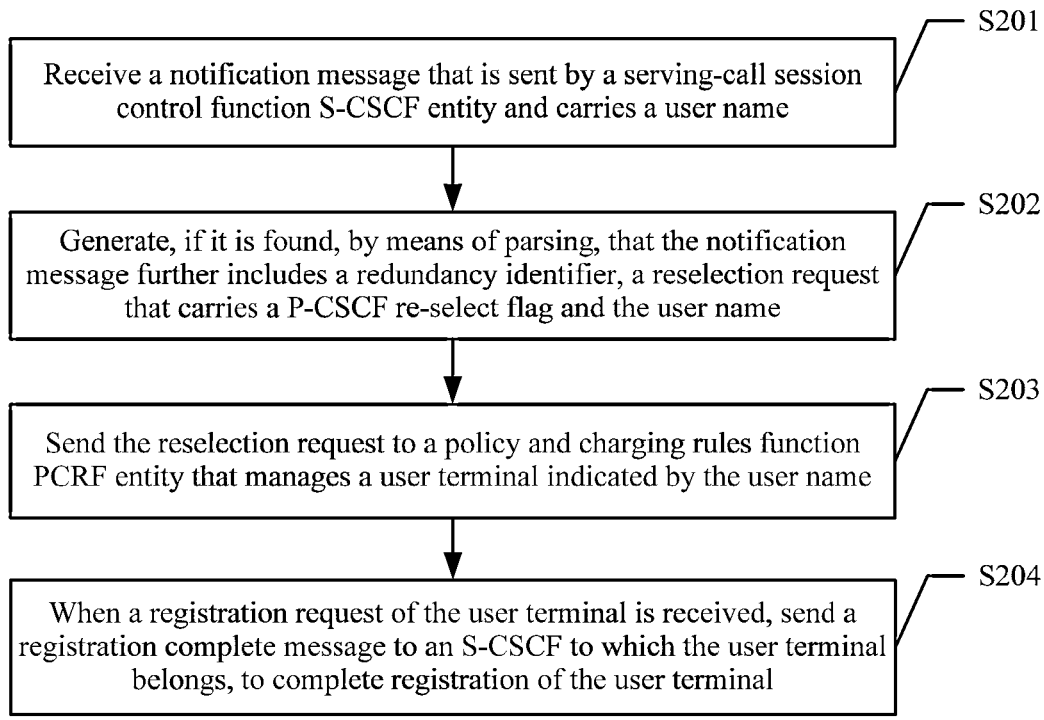
FIG. 2A is a schematic flowchart of Embodiment 2 of a method for recovering a called service of a terminal according to the present disclosure.

Referring to FIG. 2A, FIG. 2A is a schematic flowchart of Embodiment 2 of a method for recovering a called service of a terminal according to the present disclosure. The method in this embodiment of the present disclosure may be implemented in a P-CSCF, and the P-CSCF triggers, according to a notification message sent by a front-end S-CSCF, a user terminal to re-register with a P-CSCF. Specifically, in this embodiment of the present disclosure, the method includes the following steps:

S201: Receive a notification message that is sent by a serving-call session control function S-CSCF entity and carries a user name, where the user name includes an identifier of a user terminal corresponding to a called request received by the S-CSCF, that is, an identifier of a user terminal of a called party, and may be specifically an IP address, a user service permission, other user configuration information, and the like of the user terminal used as the called party.

S202: Generate, if it is found, by means of parsing, that the notification message further includes a redundancy identifier, a reselection request that carries a P-CSCF re-select flag and the user name.

The notification message that carries the redundancy identifier is generated when a P-CSCF with which the user terminal corresponding to the called request received by the S-CSCF registers is faulty, and the redundancy identifier is used to instruct to trigger the user terminal to re-register with a P-CSCF. That is, when the P-CSCF with which the user terminal used as the called party registers is faulty, a re-registration procedure is triggered.

For a process in which the S-CSCF generates the notification message that includes the redundancy identifier, refer to descriptions in Embodiment 1 of the foregoing method. In this embodiment of the present disclosure, a P-CSCF in a P-CSCF pool performs related steps, and the P-CSCF is corresponding to the available P-CSCF in Embodiment 1.

However, if the notification message received in S201 includes no redundancy identifier, a called service of a corresponding user terminal may be borne according to the user name in the notification message.

S203: Send the reselection request to a policy and charging rules function PCRF entity that manages the user terminal indicated by the user name, so that the PCRF instructs, according to the P-CSCF re-select flag, the user terminal indicated by the user name to reselect a P-CSCF to bear a called service of the user terminal.

The reselection request that is generated in S202 and carries the P-CSCF re-select flag and the user name may be specifically an STR (Session-Termination-Request), where the STR carries a defined P-CSCF re-select flag (P-CSCF re-select flag), and the user name is used to instruct the PCRF to determine a user terminal that needs to perform reselection and registration. The STR is sent to the PCRF in S203.

Specifically, when the reselection request is sent in S203, the available P-CSCF may not know the PCRF to which the user terminal corresponding to the user name belongs. In this case, S203 specifically includes: sending the reselection request to a Diameter routing agent DRA (Diameter Routing Agent), so that the DRA sends, according to the user name in the reselection request, the reselection request to the PCRF that manages the user terminal indicated by the user name. That is, the available P-CSCF may first send the STR to the DRA, and then, the DRA determines, according to the user name in the STR, the PCRF of the user terminal corresponding to the user name.

Further, before S202 is performed, the method may further include:

determining whether the user terminal indicated by the user name registers with a local end; and if the user terminal does not register with the local end, performing S202. However, if the user terminal has registered with the local end, a registration complete message may be directly sent to the S-CSCF, and the user name of the user terminal and a host name of the local end are registered in the S-CSCF, so that the S-CSCF sends the called request of the user terminal to the local end, and the local end bears the called service of the user terminal used as the called party.

That is, only when the user terminal does not register with the available P-CSCF, whether to initiate a recovery procedure is determined, so that the user terminal re-registers with a P-CSCF.

The available P-CSCF may instruct, by using the PCRF that manages the user terminal and by using a notification path of a gateway connected to the user terminal, the user terminal to re-register with a new P-CSCF, so that the S-CSCF delivers the called request of the user terminal to the new P-CSCF, and the new P-CSCF bears the called service of the user terminal. After the user terminal is instructed to re-register with the new P-CSCF, the user terminal may select the available P-CSCF. Therefore, this embodiment of the present disclosure may further include the following S204.

S204: When a registration request of the user terminal is received, send a registration complete message to an S-CSCF to which the user terminal belongs, to complete registration of the user terminal.

The user terminal may complete registration with the current P-CSCF by using an existing registration procedure. After determining that the user terminal successfully registers with the P-CSCF, the P-CSCF sends the registration complete message to a front-end S-CSCF, so as to instruct the front-end S-CSCF to deliver the received called request to the current P-CSCF to bear the called service of the user terminal.

In this embodiment of the present disclosure, when a P-CSCF with which a user terminal currently registers is faulty, the terminal is finally triggered, according to a message that carries a redundancy identifier, to re-register with a P-CSCF, and a called service of the user terminal is borne in the re-registered P-CSCF, which avoids problems in the prior art that a dual-host fault is caused because heartbeat detection needs to be performed between a primary network element and a secondary network element and processing is complex because a same IP needs to be presented to the outside. In addition, fault recovery can be quickly completed in an existing network architecture.

Figure 2B:
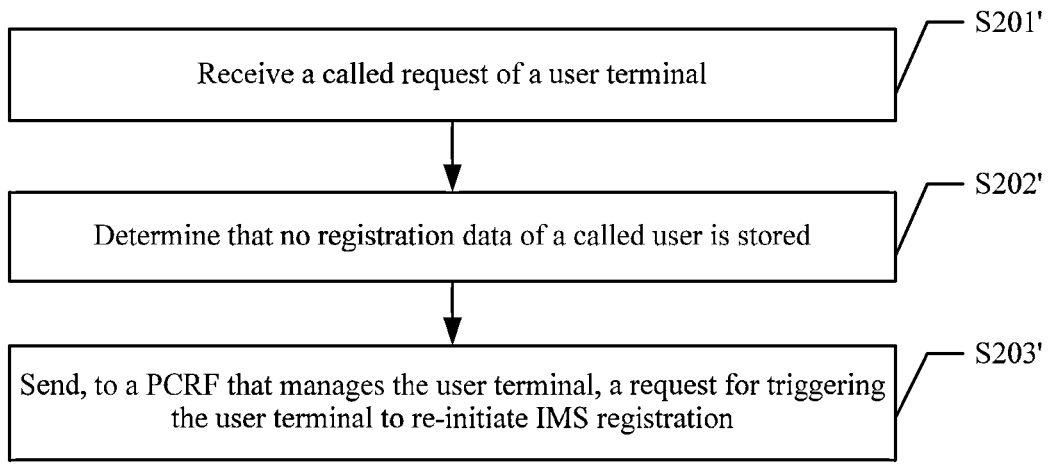
FIG. 2B is a schematic flowchart of a method for recovering a called service of a terminal according to an embodiment of the present disclosure.

This embodiment of the present disclosure further provides another method for recovering a called service of a terminal, as shown in FIG. 2B. The method shown in FIG. 2B may be implemented in a P-CSCF, and specifically, the method includes the following steps:

S201': Receive a called request of a user terminal.

In Step 201', a called request of the user terminal that is sent by an S-CSCF or an IBCF may be received.

S202': Determine that no registration data of a called user is stored.

It should be noted that, in step S202', a P-CSCF determines whether the P-CSCF stores the registration data of the called user, and performs step S203' when determining that the P-CSCF does not store the registration data of the called user.

S203': Send, to a PCRF that manages the user terminal, a request for triggering the user terminal to re-initiate IMS registration.

It should be noted that the request for triggering the user terminal to re-initiate the IMS registration may be a request that carries a re-registration identifier, where the re-registration identifier is used to trigger the user terminal to re-initiate the IMS registration. As an example instead of a limitation, the request that carries the re-registration identifier may be an STR or an AAR (Authorization and Authentication Request).

Figure 3:
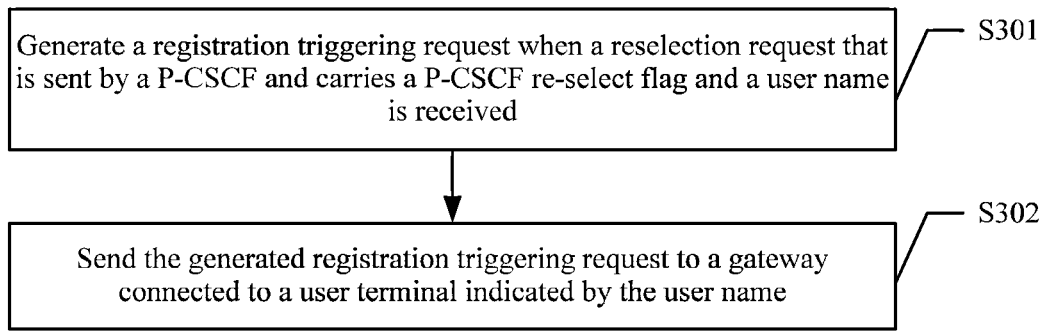
FIG. 3 is a schematic flowchart of Embodiment 3 of a method for recovering a called service of a terminal according to the present disclosure.

Referring to FIG. 3, FIG. 3 is a schematic flowchart of Embodiment 3 of a method for recovering a called service of a terminal according to the present disclosure. The method in this embodiment of the present disclosure may be applied to a policy and charging rules function PCRF entity that manages a user terminal. When receiving a reselection request, such as an STR that carries a P-CSCF re-select flag, that is sent by a P-CSCF, the PCRF performs steps of the method in this embodiment of the present disclosure. Specifically, the method includes the following steps:

S301: Generate a registration triggering request when a reselection request that is sent by a P-CSCF and carries a P-CSCF re-select flag and a user name is received, where the user name includes an identifier of a user terminal corresponding to a called request received by an S-CSCF, that is, an identifier of a user terminal of a called party, and may be specifically an IP address, a user service permission, other user configuration information, and the like of the user terminal used as the called party.

S302: Send the generated registration triggering request to a gateway connected to the user terminal indicated by the user name, so that the gateway triggers the user terminal indicated by the user name to re-register with a P-CSCF to bear a called service of the user terminal.

The reselection request is generated by the P-CSCF according to a notification message that is sent by the S-CSCF and carries the user name and a redundancy identifier, where the redundancy identifier is used to instruct to trigger the user terminal indicated by the user name to re-register with the P-CSCF. The reselection request may be an STR or the like, and for a specific process of generating the reselection request, refer to descriptions in Embodiment 2.

After receiving the reselection request such as the STR that carries the P-CSCF re-select flag, the PCRF needs to perform a procedure of recovering the called service of the user terminal corresponding to the user name, that is, generating the registration triggering request and sending the registration triggering request to the gateway of the user terminal corresponding to the user name. The gateway may be a P-GW (Packet data network Gateway) or an S-GW (Serving Gateway). The gateway directly triggers the user terminal to reselect a new P-CSCF.

Specifically, S301 may specifically include:

when the reselection request that is sent by the P-CSCF and carries the P-CSCF re-select flag and the user name is received, generating a registration triggering request that carries a session release message, where the session release message is used to instruct the gateway connected to the user terminal indicated by the user name to request a mobility management entity MME (Mobility Management Entity) to delete a user bearer of a user terminal.

The registration triggering request may be an RAR (Re-Auth-Request, re-authentication request) that carries a Session-Release-Cause AVP (attribute-value pair), that is, an attribute field of Session-Release-Cause and a field value are carried in the RAR to instruct the gateway to request to delete all bearers of the user terminal. The gateway directly requests to release an IMS (IP multimedia subsystem) PDN (Packet Data Network) of the user terminal corresponding to the user name, that is, delete a communications network that bears IMS signaling of the user terminal.

The user terminal loses a connection after the MME deletes the IMS PDN. The user terminal detects an access failure, and automatically performs a new registration procedure to complete registration with the P-CSCF and the like, to implement network accessing. The user terminal selects an available third P-CSCF3 and initiates SIP (Session Initiation Protocol) initial registration with the third P-CSCF. After receiving a registration request of the user terminal, the third P-CSCF sends a message to an S-CSCF to which the user terminal belongs, to complete the registration request. The third P-CSCF may determine, by using an I-CSCF, the S-CSCF to which the user terminal belongs, and then send a registration complete message to the found S-CSCF to which the user terminal belongs, to complete the registration request. Then, the S-CSCF delivers the called request of the user terminal to the third P-CSCF to bear the called service.

Alternatively, S301 includes:

when the reselection request that is sent by the P-CSCF and carries the P-CSCF re-select flag and the user name is received, generating a registration triggering request that carries update P-CSCF address information, where the update P-CSCF address information is used to instruct the gateway connected to the user terminal indicated by the user name to generate a list of available P-CSCF addresses and send the list of the available P-CSCF addresses to the user terminal indicated by the user name.

The registration triggering request is an RAR that carries an update P-CSCF address (update P-CSCF address) request. After receiving the RAR, the gateway sends an update PDP (Packet Data Protocol) context Update PDP Context message to the user terminal, so that the user terminal completes re-registration. After receiving the Update PDP Context, the user terminal updates a local P-CSCF list according to the list of the available P-CSCF addresses in the Update PDP Context, checks whether an initial P-CSCF with which a local end registers is in the list, and if the initial P-CSCF with which the local end registers is not in the list, the user terminal initiates a procedure of re-registering with a P-CSCF, which may be specifically selecting an available third P-CSCF3 from a new P-CSCF list (list) delivered by the gateway and registering with the third P-CSCF3 to bear the called service of the user terminal. The third P-CSCF may determine, by using an I-CSCF, an S-CSCF to which the user terminal belongs, and then send a registration complete message to the found S-CSCF to which the user terminal belongs, to complete the registration request. Then, the S-CSCF delivers the called request of the user terminal to the third P-CSCF to bear the called service.

In this embodiment of the present disclosure, when a P-CSCF with which a user terminal currently registers is faulty, the terminal is finally triggered, according to a message that carries a redundancy identifier, to re-register with a P-CSCF, and a called service of the user terminal is borne in the re-registered P-CSCF, which avoids problems in the prior art that a dual-host fault is caused because heartbeat detection needs to be performed between a primary network element and a secondary network element and processing is complex because a same IP needs to be presented to the outside. In addition, fault recovery can be quickly completed in an existing network architecture.

Figure 4:
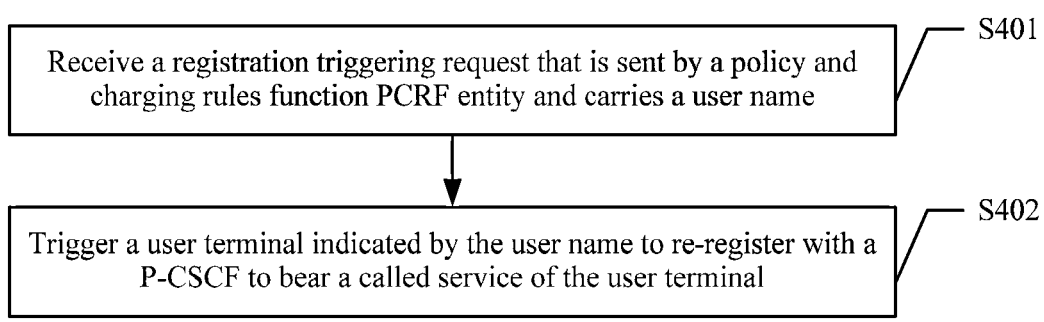
FIG. 4 is a schematic flowchart of Embodiment 4 of a method for recovering a called service of a terminal according to the present disclosure.

Referring to FIG. 4, FIG. 4 is a schematic flowchart of Embodiment 4 of a method for recovering a called service of a terminal according to the present disclosure. The method in this embodiment of the present disclosure may be applied to, for example, a P-GW or an S-GW. When receiving a registration triggering request, such as an RAR, that is sent by a PCRF, the P-GW or the S-GW performs steps of the method in this embodiment of the present disclosure. Specifically, the method includes the following steps:

S401: Receive a registration triggering request that is sent by a policy and charging rules function PCRF entity and carries a user name, where the user name includes an identifier of a user terminal corresponding to a called request received by an S-CSCF, that is, an identifier of a user terminal used as a called party, and may be specifically an IP address, a user service permission, other user configuration information, and the like of the user terminal used as the called party.

S402: Trigger the user terminal indicated by the user name to re-register with a P-CSCF to bear a called service of the user terminal.

The registration triggering request is generated when the PCRF receives a reselection request that is sent by a P-CSCF and carries a P-CSCF re-select flag and the user name, and the reselection request is generated by the P-CSCF according to a notification message that is sent by the S-CSCF and carries the user name and a redundancy identifier, where the redundancy identifier is used to instruct to trigger the user terminal indicated by the user name to re-register with the P-CSCF.

For processes of generating the reselection request and the registration triggering request, refer to descriptions in Embodiment 2 and Embodiment 3 accordingly.

Specifically, S402 may specifically include:

when the registration triggering request carries a session release message, sending, to a mobility management entity MME, a release request that carries the user name, so that the MME deletes a user bearer of the user terminal indicated by the user name; or when the registration triggering request carries update P-CSCF address information, acquiring a list of available P-CSCF addresses and sending the list of the available P-CSCF addresses to the user terminal indicated by the user name, so that the user terminal selects a P-CSCF from the list of the available P-CSCF addresses and registers with the selected P-CSCF.

After receiving an RAR that is sent by the PCRF and carries a Session-Release-Cause AVP, the gateway instructs the MME to delete an IMS PDN of a user, and triggers the user terminal to re-register with a P-CSCF. When receiving an RAR that is sent by the PCRF and carries an update P-CSCF address request, the gateway acquires an Update PDP Context message and sends the Update PDP Context message to the user terminal to trigger the user terminal to update a local P-CSCF list according to the list of the available P-CSCF addresses in the Update PDP Context message, and after determining that an updated local P-CSCF list does not include an initial P-CSCF with which a local end has registered, selects a new P-CSCF and registers with the selected P-CSCF to complete re-registration.

In this embodiment of the present disclosure, when a P-CSCF with which a user terminal currently registers is faulty, the terminal is finally triggered, according to a message that carries a redundancy identifier, to re-register with a P-CSCF, and a called service of the user terminal is borne in the re-registered P-CSCF, which avoids problems in the prior art that a dual-host fault is caused because heartbeat detection needs to be performed between a primary network element and a secondary network element and processing is complex because a same IP needs to be presented to the outside. In addition, fault recovery can be quickly completed in an existing network architecture.

Figure 5:
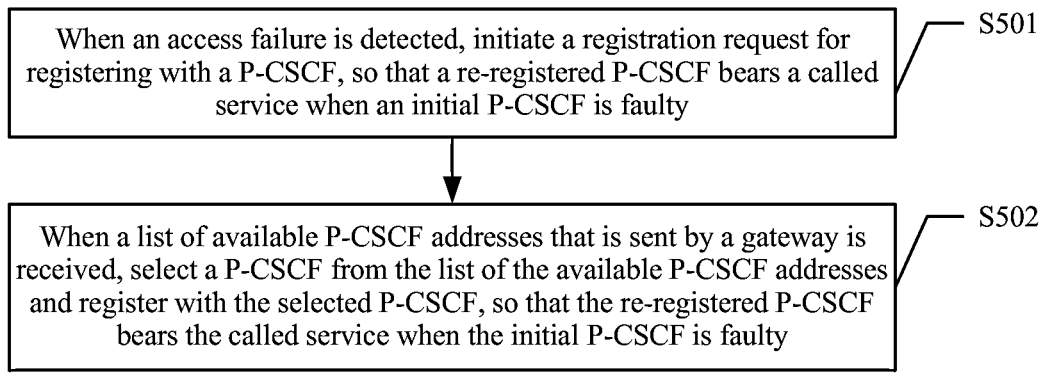
FIG. 5 is a schematic flowchart of Embodiment 5 of a method for recovering a called service of a terminal according to the present disclosure.

Referring to FIG. 5, FIG. 5 is a schematic flowchart of Embodiment 5 of a method for recovering a called service of a terminal according to the present disclosure. The method in this embodiment of the present disclosure may be applied to a user terminal. When determining that an IMS PDN in an MME is deleted or a list of available P-CSCF addresses that is sent by a P-GW or an S-GW is received, the user terminal performs related steps of the method in this embodiment of the present disclosure. Specifically, the method includes the following steps:

S501: When an access failure is detected, initiate a registration request for registering with a P-CSCF, so that a re-registered P-CSCF bears a called service when an initial P-CSCF is faulty.

A user terminal loses a connection after an MME deletes an IMS PDN. The user terminal detects the access failure, and automatically performs a new registration procedure to complete registration with the P-CSCF and the like, to implement network accessing. The user terminal selects an available third P-CSCF3 and initiates SIP initial registration with the third P-CSCF. After receiving the registration request of a user terminal, the third P-CSCF sends a message to an S-CSCF to which the user terminal belongs, to complete the registration request. The third P-CSCF may determine, by using an I-CSCF, the S-CSCF to which the user terminal belongs, and then send a registration complete message to the found S-CSCF to which the user terminal belongs, to complete the registration request. Then, the S-CSCF delivers a called request of the user to the third P-CSCF to bear the called service.

S502: When a list of available P-CSCF addresses that is sent by a gateway is received, select a P-CSCF from the list of the available P-CSCF addresses and register with the selected P-CSCF, so that the re-registered P-CSCF bears the called service when the initial P-CSCF is faulty.

Specifically, S502 may specifically include: when the list of the available P-CSCF addresses that is sent by the gateway is received, determining whether the list of the available P-CSCF addresses includes a host name of the initial P-CSCF with which the user terminal currently registers; and if the list of the available P-CSCF addresses does not include the host name of the initial P-CSCF, selecting the P-CSCF from the list of the available P-CSCF addresses and registering with the selected P-CSCF.

The registration triggering request is an RAR that carries an update P-CSCF address request. After receiving the RAR, the gateway sends an update PDP context Update PDP Context message to the user terminal, so that the user terminal completes re-registration. After receiving the Update PDP Context, the user terminal updates a local P-CSCF list according to the list of the available P-CSCF addresses in the Update PDP Context, checks whether an initial P-CSCF with which a local end registers is in the list, and if not, the user terminal initiates a procedure of re-registering with a P-CSCF, which may be specifically selecting the available third P-CSCF3 from a new P-CSCF list delivered by the gateway and registering with the third P-CSCF3 to bear the called service of the user terminal. The third P-CSCF may determine, by using an I-CSCF, the S-CSCF to which the user terminal belongs, and then send a registration complete message to the found S-CSCF to which the user terminal belongs, to complete the registration request. Then, the S-CSCF delivers the called request of the user terminal to the third P-CSCF to bear the called service.

It should be noted that S501 and S502 are not performed in sequence. Whether access fails may be first detected, and then S502 is performed; or whether the list of the available P-CSCF addresses that is sent by the gateway is received is first detected, and then S501 is performed.

In this embodiment of the present disclosure, when a P-CSCF with which a user terminal currently registers is faulty, the terminal can re-register with a new P-CSCF according to a structure, on a network side, for recovery processing based on a message that carries a redundancy identifier, and carry a called service of the user terminal in the new P-CSCF, which avoids problems in the prior art that a dual-host fault is caused because heartbeat detection needs to be performed between a primary network element and a secondary network element and processing is complex because a same IP needs to be presented to the outside. In addition, fault recovery can be quickly completed in an existing network architecture.

Figure 6:
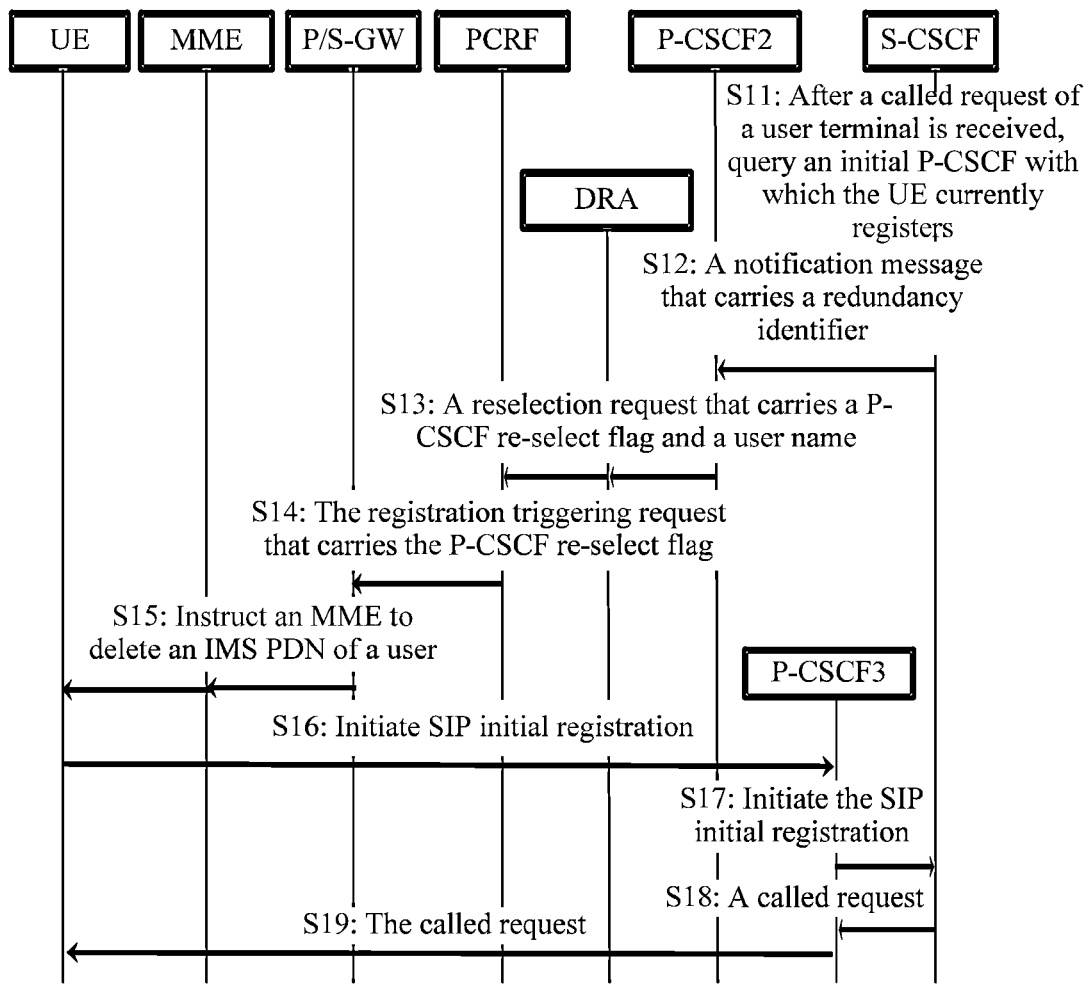
FIG. 6 is a schematic flowchart of Embodiment 6 of a method for recovering a called service of a terminal according to the present disclosure.

Referring to FIG. 6, FIG. 6 is a schematic flowchart of Embodiment 6 of a method for recovering a called service of a terminal according to the present disclosure. In the method in this embodiment of the present disclosure, by using a user terminal UE, an S-CSCF, a P-CSCF, a PCRF, and a gateway, quick recovery of a called service of the user terminal is implemented when a P-CSCF with which the user terminal currently registers is faulty. Specifically, as shown in FIG. 6, the method includes the following steps:

S11: After receiving a called request of a user terminal, an S-CSCF queries an initial P-CSCF with which the user terminal currently registers; the S-CSCF finds, by means of querying, an IP address of the P-CSCF according to a host name of the P-CSCF, and configures, on a DNS, two IPs, namely, an IP1 and an IP2 that are respectively corresponding to a P-CSCF1 and a P-CSCF2, for a host name of the P-CSCF1, that is, the initial P-CSCF.

S12: The S-CSCF detects that the initial P-CSCF is faulty, selects an available P-CSCF, and sends, to the available P-CSCF, a notification message that carries a redundancy identifier, where the redundancy identifier is used to instruct the available P-CSCF to trigger the user terminal to re-register with the P-CSCF.

After sensing that the P-CSCF (P-CSCF1) corresponding to the IP1 is faulty, the S-CSCF sends, to the available P-CSCF (P-CSCF2) corresponding to the IP2, a NOTIFY that carries the redundancy identifier to instruct the user terminal to re-register with the P-CSCF.

S13: After receiving the notification message that carries the redundancy identifier and a user name, the P-CSCF2 generates a reselection request that carries a P-CSCF re-select flag and the user name, and sends the reselection request to a PCRF, where the PCRF is configured to manage a user terminal indicated by the user name.

When detecting that the message carries the redundancy identifier, or the message carries the redundancy identifier and does not register with a local end, the P-CSCF2 initiates a redundancy procedure. The P-CSCF2 sends an STR (that is, the reselection request) to the PCRF, where the STR carries a self-defined P-CSCF re-select flag. If the P-CSCF2 does not know the PCRF of a user terminal, the STR is first sent to a DRA, and the DRA routes the STR to the PCRF on which the user terminal is located.

S14: After receiving the reselection request that is sent by the P-CSCF and carries the P-CSCF re-select flag and the user name, the PCRF generates a registration triggering request and sends the registration triggering request to a gateway, where the gateway is an S-GW or a P-GW and is connected to the user terminal.

After receiving the STR that carries the P-CSCF re-select flag, the PCRF needs to perform a redundancy procedure. The PCRF sends an RAR to the P/S-GW to request to delete all bearers of the user terminal.

S15: After receiving the registration triggering request that is sent by the policy and charging rules function PCRF entity and carries the user name, the P/S-GW triggers the user terminal indicated by the user name to re-register with the P-CSCF.

After receiving the RAR sent by the PCRF, the P/S-GW instructs the MME to delete an IMS PDN of the user, and triggers the user to perform re-registration.

S16: The user terminal selects an available P-CSCF3, and initiates SIP initial registration with the P-CSCF3.

S17: After receiving a registration request of the user terminal, the P-CSCF3 initiates SIP registration with an S-CSCF to which a user terminal belongs, to complete the registration request, and the P-CSCF3 may determine, in a manner of querying an I-CSCF, the S-CSCF to which the user terminal belongs.

S18: The S-CSCF delivers the called request to the P-CSCF3.

S19: The P-CSCF3 sends the called request to a UE to bear a called service of the user terminal according to the called request, so as to complete the called service of the user terminal.

In this embodiment of the present disclosure, when a P-CSCF with which a user terminal currently registers is faulty, the terminal is finally triggered, according to a message that carries a redundancy identifier, to re-register with a P-CSCF, and a called service of the user terminal is borne in the re-registered P-CSCF, which avoids problems in the prior art that a dual-host fault is caused because heartbeat detection needs to be performed between a primary network element and a secondary network element and processing is complex because a same IP needs to be presented to the outside. In addition, fault recovery can be quickly completed in an existing network architecture.

Figure 7:
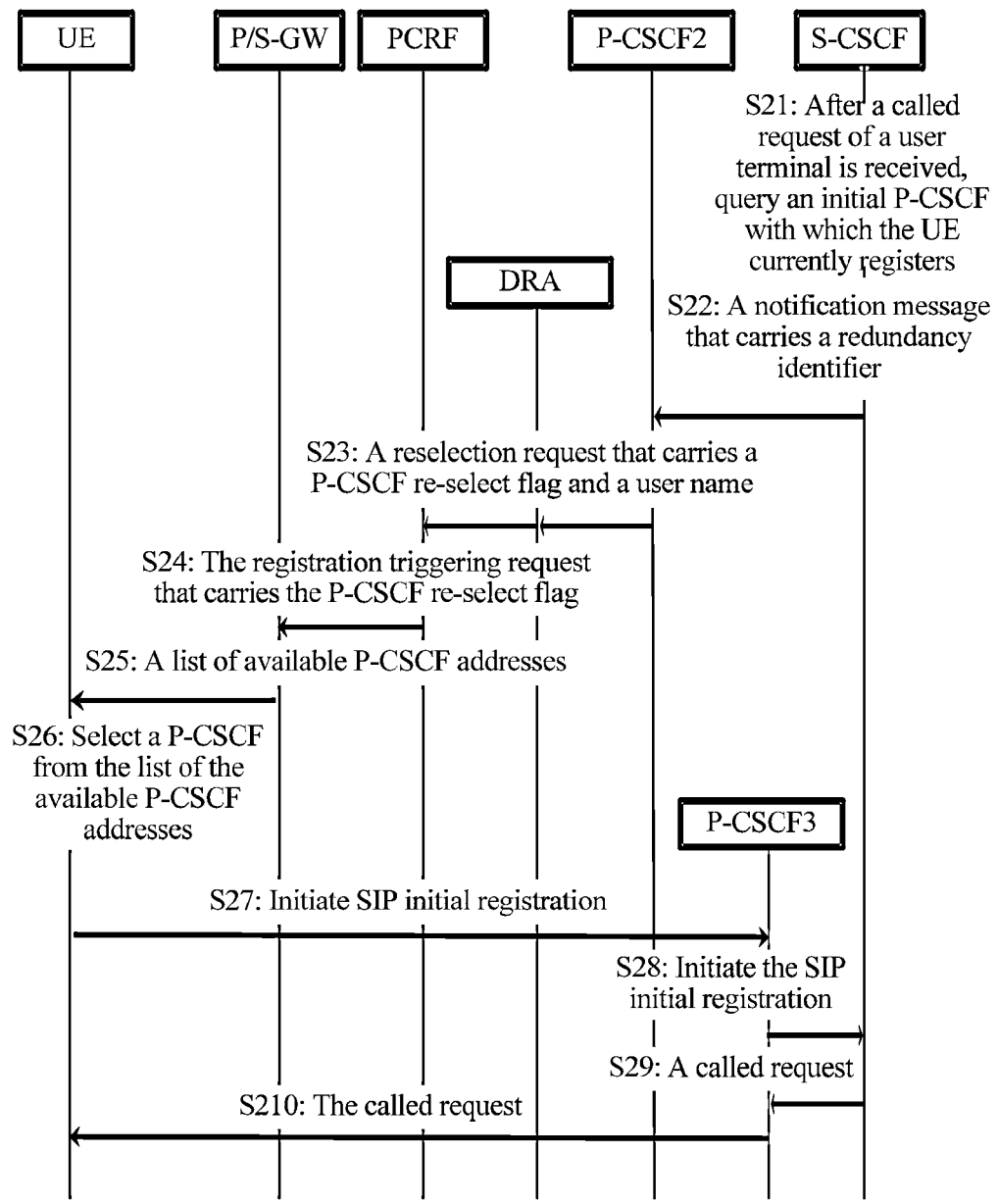
FIG. 7 is a schematic flowchart of Embodiment 7 of a method for recovering a called service of a terminal according to the present disclosure.

Referring to FIG. 7, FIG. 7 is a schematic flowchart of Embodiment 7 of a method for recovering a called service of a terminal according to the present disclosure. In the method in this embodiment of the present disclosure, by using a user terminal, an S-CSCF, a P-CSCF, a PCRF, and a gateway, quick recovery of a called service of the user terminal is implemented when a P-CSCF with which the user terminal currently registers is faulty. Specifically, as shown in FIG. 7, the method includes the following steps:

S21: After receiving a called request, an S-CSCF queries an initial P-CSCF with which a user terminal corresponding to the called request currently registers, where the initial P-CSCF is an initial P-CSCF of a user terminal used as a called party; the S-CSCF finds, by means of querying, an IP address of the P-CSCF according to a host name of the P-CSCF, and configures, on a DNS, two IPs, namely, an IP1 and an IP2 that are respectively corresponding to a P-CSCF1 and a P-CSCF2, for a host name of the P-CSCF1, that is, the initial P-CSCF.

S22: The S-CSCF detects that the initial P-CSCF is faulty, selects an available P-CSCF, and sends, to the available P-CSCF, a notification message that carries a redundancy identifier, where the redundancy identifier is used to instruct the available P-CSCF to trigger the user terminal to re-register with the P-CSCF.

After sensing that the P-CSCF (P-CSCF1) corresponding to the IP1 is faulty, the S-CSCF sends, to the available P-CSCF (P-CSCF2) corresponding to the IP2, a NOTIFY that carries the redundancy identifier to instruct the user terminal to re-register with the P-CSCF.

S23: After receiving the notification message that carries the redundancy identifier and a user name, the P-CSCF2 generates a reselection request that carries a P-CSCF re-select flag and the user name, and sends the reselection request to a PCRF, where the PCRF is configured to manage a user terminal indicated by the user name.

When detecting that the message carries the redundancy identifier, or the message carries the redundancy identifier and does not register with a local end, the P-CSCF2 initiates a redundancy procedure. The P-CSCF2 sends an STR (that is, the reselection request) to the PCRF, where the STR carries a self-defined P-CSCF re-select flag. If the P-CSCF2 does not know the PCRF of a user terminal, the STR is first sent to a DRA, and the DRA routes the STR to the PCRF on which the user terminal is located.

S24: After receiving the reselection request that is sent by the P-CSCF and carries the P-CSCF re-select flag and the user name, the PCRF generates a registration triggering request and sends the registration triggering request to a gateway, where the gateway is an S-GW or a P-GW and is connected to the user terminal.

After receiving the STR that carries the P-CSCF re-select flag, the PCRF needs to perform a redundancy procedure. A method for redundancy by the PCRF is sending an RAR to the P-GW, where the RAR carries an update P-CSCF address request, and the request may be proprietary.

S25: When the registration triggering request carries update P-CSCF address information, the P/S-GW acquires a list of available P-CSCF addresses, and sends the list of the available P-CSCF addresses to the user terminal indicated by the user name.

After receiving the RAR, the P/S-GW sends an Update PDP Context message to the user terminal, where the Update PDP Context message includes the list of the available P-CSCF addresses.

S26: When receiving the list of the available P-CSCF addresses that is sent by the gateway, the user terminal selects a P-CSCF from the list of the available P-CSCF addresses, so as to bear, by using the re-registered P-CSCF, a called service when the initial P-CSCF is faulty.

After receiving the Update PDP Context, the user terminal updates a P-CSCF list, and checks whether the P-CSCF1 with which the user terminal registers is in the list; and if not, a UE initiates a re-registration procedure, and selects an available P-CSCF3 from a new P-CSCF List delivered by the P-GW, to perform registration.

S27: Send a registration request and register with a selected P-CSCF3.

S28: After receiving a registration request of the user terminal, the P-CSCF3 sends a message to an S-CSCF to which a user terminal belongs, to complete the registration request, where the P-CSCF3 may determine, in a manner of querying an I-CSCF, the S-CSCF to which the user terminal belongs.

S29: The S-CSCF delivers the called request to the P-CSCF3.

S210: The P-CSCF3 sends the called request to a UE to bear a called service of the user terminal according to the called request, so as to complete the called service of the user terminal.

In this embodiment of the present disclosure, when a P-CSCF with which a user terminal currently registers is faulty, the terminal is finally triggered, according to a message that carries a redundancy identifier, to re-register with a P-CSCF, and a called service of the user terminal is borne in the re-registered P-CSCF, which avoids problems in the prior art that a dual-host fault is caused because heartbeat detection needs to be performed between a primary network element and a secondary network element and processing is complex because a same IP needs to be presented to the outside. In addition, fault recovery can be quickly completed in an existing network architecture.

Figure 8:
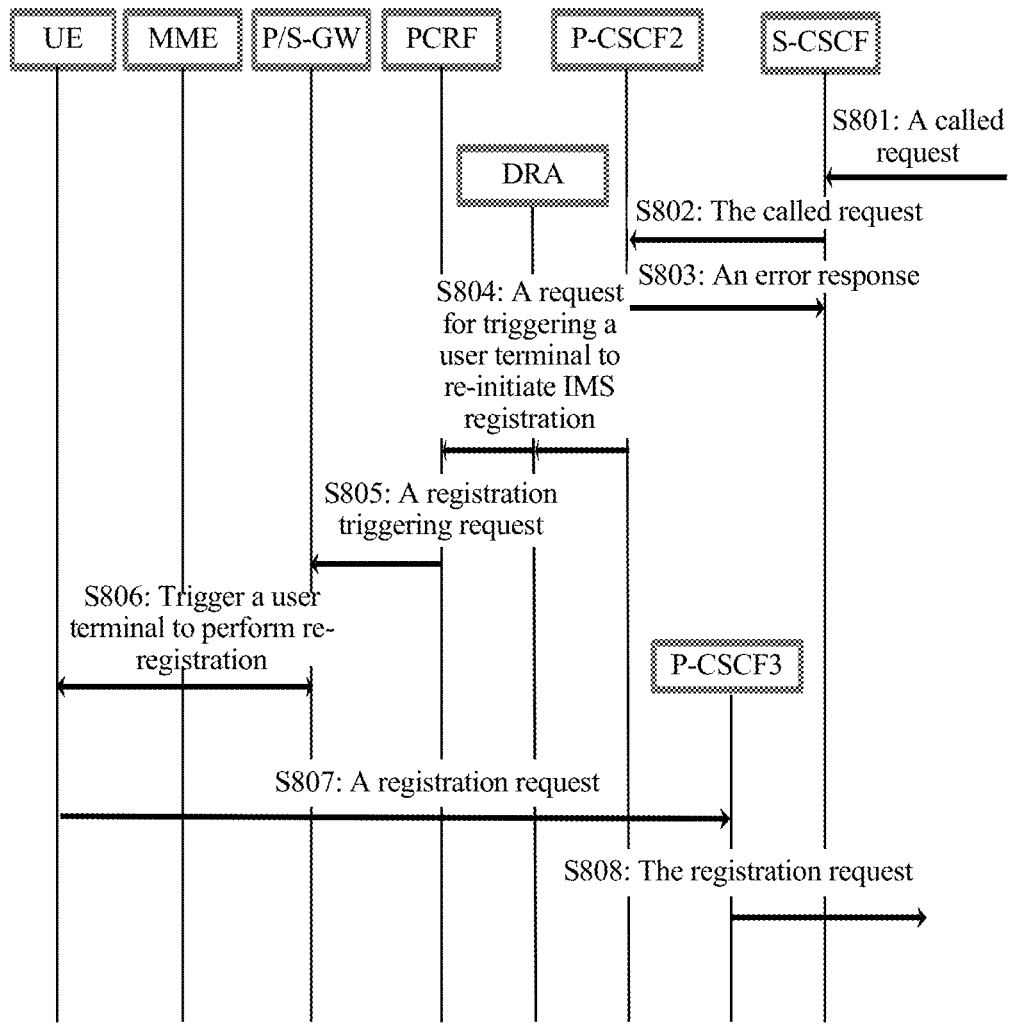
FIG. 8 is a schematic flowchart of a method for recovering a called service of a terminal according to an embodiment of the present disclosure.

FIG. 8 is a schematic flowchart of a method for recovering a called service of a terminal according to an embodiment of the present disclosure. In the method in this embodiment of the present disclosure, by using a user terminal UE, an S-CSCF, a P-CSCF, a PCRF, and a gateway, the user terminal is triggered to perform re-registration when a P-CSCF with which the user terminal currently registers is faulty. Specifically, as shown in FIG. 8, the method includes the following steps:

S801: After receiving a called request of a user terminal, an S-CSCF acquires an address of a P-CSCF1 that is stored when a called user successfully registers with the P-CSCF1.

For the address of the P-CSCF, an address or addresses of one or more secondary devices, for example, an address of a P-CSCF2, may be preconfigured on the S-CSCF. Another manner of acquiring an address of a secondary P-CSCF is: when a stored P-CSCF address is a domain name, an address of a secondary P-CSCF2 is acquired by querying on a DNS.

If the S-CSCF detects (for example, by means of options heartbeat detection) that the P-CSCF is faulty, the S-CSCF selects the secondary P-CSCF2 during routing.

S802: The S-CSCF sends the called request to an available P-CSCF2.

S803: After receiving the called request, the P-CSCF2 finds that no registration data of the called user is stored, and returns an error response to the S-CSCF to refuse a current call.

Specifically, when finding that the P-CSCF2 does not store the registration data of the called user, the P-SCCF2 returns the error response to the S-CSCF.

S804: The P-CSCF2 sends, to a PCRF, a request for triggering the user terminal to re-initiate IMS registration.

Optionally, the request may carry a re-registration identifier, where the re-registration identifier is used to trigger the user terminal to re-initiate the IMS registration.

The request sent by the P-CSCF2 to the PCRF may be an STR or an AAR. It should be noted that the P-CSCF2 may also send, to a DRA, the request for triggering the user terminal to re-initiate the IMS registration, and the DRA routes, to the PCRF to which the user terminal belongs, the request for triggering the user terminal to re-initiate the IMS registration.

S805: After receiving the request for triggering the user terminal to re-initiate the IMS registration, the PCRF generates a registration triggering request and sends the registration triggering request to a gateway, where the gateway may be an S-GW or a P-GW.

S806: When receiving the registration triggering request sent by the PCRF, the P-GW or the S-GW triggers the user terminal to perform re-registration.

Specifically, the P-GW or the S-GW instructs an MME to delete an IMS PDN of the user, and triggers the user to perform re-registration.

S807: The user terminal selects an available P-CSCF, for example, the user terminal selects a P-CSCF3, and sends a SIP initial registration request to the P-CSCF3.

S808: After the P-CSCF3 receives the registration request of the user terminal, a subsequent procedure is the same as a normal registration procedure, and after registration is completed, the user may normally process a service.

In this embodiment of the present disclosure, when a P-CSCF with which a user terminal currently registers is faulty, an S-CSCF finally triggers, by using a secondary P-CSCF, the terminal to perform re-registration, so that a service is recovered after a user of the terminal who needs to use the service completes registration.

Figure 9:
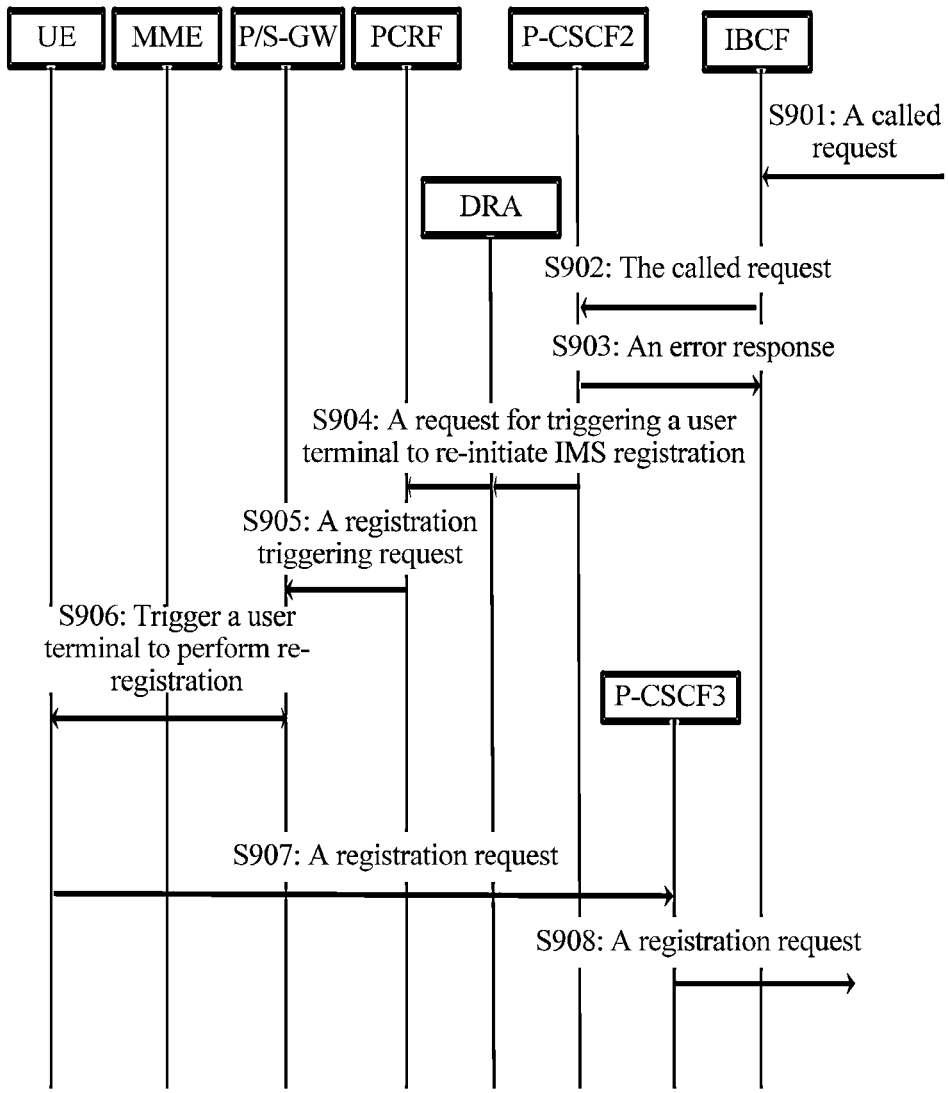
FIG. 9 is a schematic flowchart of a method for recovering a called service of a terminal according to an embodiment of the present disclosure.

FIG. 9 is a schematic flowchart of a method for recovering a called service of a terminal according to an embodiment of the present disclosure. In the method in this embodiment of the present disclosure, by using a user terminal UE, an IBCF, a P-CSCF, a PCRF, and a gateway, the user terminal is triggered to perform re-registration when a P-CSCF with which the user terminal currently registers is faulty. Specifically, as shown in FIG. 9, the method includes the following steps:

S901: After receiving a called request of a user terminal, an IBCF (Interconnection Border Control Function) acquires an address of a next-hop P-CSCF1 from a requested route header field.

For the address of the P-CSCF, an address or addresses of one or more secondary devices, for example, an address of a P-CSCF2, may be preconfigured on the IBCF. Another manner of acquiring an address of a secondary P-CSCF is: when a stored P-CSCF address is a domain name, an address of a secondary P-CSCF2 is acquired by querying on a DNS.

When detecting (for example, by means of options heartbeat detection) that the P-CSCF1 is faulty, the IBCF selects the secondary P-CSCF2.

S902: The IBCF sends the called request to the available P-CSCF2.

S903: After receiving the called request, the P-CSCF2 finds that no registration data of a called user is stored, and returns an error response to the IBCF to refuse a current call.

Specifically, when finding that the P-CSCF2 does not store the registration data of the called user, the P-SCCF2 returns the error response to the S-CSCF.

S904: The P-CSCF2 sends, to a PCRF, a request for triggering the user terminal to re-initiate IMS registration.

Optionally, the request may carry a re-registration identifier, where the re-registration identifier is used to trigger the user terminal to re-initiate the IMS registration.

The request sent by the P-CSCF2 to the PCRF may be an STR or an AAR. It should be noted that the P-CSCF2 may also send, to a DRA, the request for triggering the user terminal to re-initiate the IMS registration, and the DRA routes, to the PCRF to which the user terminal belongs, the request for triggering the user terminal to re-initiate the IMS registration.

S905: After receiving the request for triggering the user terminal to re-initiate the IMS registration, the PCRF generates a registration triggering request and sends the registration triggering request to a gateway, where the gateway may be an S-GW or a P-GW.

S906: When receiving the registration triggering request sent by the PCRF, the P-GW or the S-GW triggers the user terminal to perform re-registration.

Specifically, the P-GW or the S-GW instructs an MME to delete an IMS PDN of the user, and triggers the user to perform re-registration.

S907: The user terminal selects an available P-CSCF, for example, the terminal selects a P-CSCF3, and initiates a SIP initial registration request to the P-CSCF3.

S908: After the P-CSCF3 receives the registration request of the user terminal, a subsequent procedure is the same as a normal registration procedure, and after registration is completed, the user may normally process a service.

In this embodiment of the present disclosure, when a P-CSCF with which a user terminal currently registers is faulty, an S-CSCF finally triggers, by using a secondary P-CSCF, the terminal to perform re-registration, so that a service is recovered after a user of the terminal who needs to use the service completes registration.

The following describes in detail apparatuses for recovering a called service of a terminal and a system thereof according to embodiments of the present disclosure.

Figure 10:
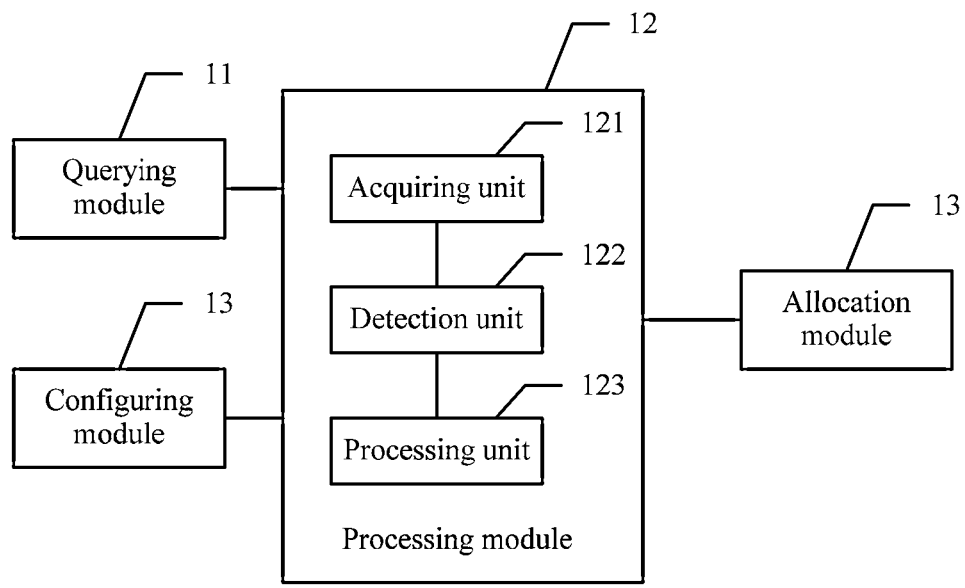
FIG. 10 is a schematic structural diagram of Embodiment 1 of an apparatus for recovering a called service of a terminal according to the present disclosure.

Referring to FIG. 10, FIG. 10 is a schematic structural diagram of Embodiment 1 of an apparatus for recovering a called service of a terminal according to the present disclosure. The apparatus in this embodiment of the present disclosure may be an S-CSCF or an IBCF. Specifically, the apparatus includes:

a querying module 11, configured to: when a called request of a user terminal is received, query an initial proxy-call session control function P-CSCF entity with which the user terminal currently registers; and a processing module 12, configured to: if it is detected that the initial P-CSCF is faulty, select an available P-CSCF and send a notification message to the available P-CSCF to trigger the user terminal to re-register with the P-CSCF.

In a possible implementation manner, the processing module 12 may be specifically configured to: after selecting the available P-CSCF, send, to the available P-CSCF, a notification message that carries a redundancy identifier, where the redundancy identifier is used to instruct the available P-SCCF to trigger the user terminal to re-register with the P-CSCF. In another possible implementation manner, the processing module 12 may be specifically configured to: after selecting the available P-CSCF, send the called request of the user terminal to the available P-CSCF, so as to trigger, when the available P-CSCF determines that no registration data of a called user is stored, the user terminal to re-initiate IMS registration.

Optionally, the apparatus may further include an allocation module 13. The allocation module 13 is configured to: when a registration complete message sent by the P-CSCF with which the user terminal re-registers is received, deliver the called request to the re-registered P-CSCF to bear a called service of the user terminal.

The available P-CSCF triggers, by using a PCRF, the user terminal to re-register with the P-CSCF.

After the user terminal registers with the P-CSCF, the P-CSCF sends corresponding registration complete information to an S-CSCF, and the S-CSCF performs authentication, and performs processing such as registering a user name of the user terminal and a host name of the P-CSCF with which the user terminal registers; therefore, according to a user name (a user name of a user terminal used as a called party) of the user terminal corresponding to the called request, the querying module 11 may query and determine the initial P-CSCF with which the user terminal currently registers. The user name of the user terminal is used to identify the user terminal, and may be specifically an IP address, a user service permission, other user configuration information, and the like of the user terminal.

The processing module 12 may specifically perform heartbeat detection on each P-CSCF in a current P-CSCF pool by using a heartbeat mechanism, and determine, according to data of the heartbeat detection or according to whether heartbeat data can be normally received, whether the initial P-CSCF with which the user terminal currently registers is faulty, for example, it may be determined that the initial P-CSCF is faulty when a ping command has no response or a detection message fails to be received or sent.

When it is detected that the initial P-CSCF is faulty, the processing module 12 specifically selects an available P-CSCF from the current P-CSCF pool. The available P-CSCF may be a P-CSCF that is determined, by means of heartbeat detection or other manners, to be not faulty. The processing module 12 may also select a secondary P-CSCF of the initial P-CSCF as the available P-CSCF according to two identifiers configured for the initial P-CSCF.

The available P-CSCF may learn, according to the redundancy identifier in the notification message, that the current P-CSCF with which the user terminal registers is faulty, and initiate the procedure of triggering the user terminal to re-register with the P-CSCF. Specifically, the available P-CSCF may instruct, by using the policy and charging rules function PCRF entity that manages the user terminal and by using a path of a gateway connected to the user terminal, the user terminal to re-register with a new P-CSCF, so that the allocation module 13 delivers the called request of the user terminal to the new P-CSCF, and the new P-CSCF bears the called service of the user terminal. The available P-CSCF may also determine, when receiving the called request of the user terminal and when determining that the available P-CSCF does not store the registration data of the called user, that the current P-CSCF with which the user terminal registers is faulty, and the procedure of triggering the user terminal to re-register with the P-CSCF needs to be initiated.

Further, optionally, as shown in FIG. 10, the apparatus may further include:

a configuration module 14, configured to configure a first identifier and a second identifier for the initial P-CSCF, where the first identifier includes an IP address of the initial P-CSCF, and the second identifier includes an IP address of a P-CSCF except the initial P-CSCF.

Further, the configuration module 14 is specifically configured to configure, on a domain name system DNS server, the first identifier and the second identifier according to a host name of the initial P-CSCF.

The configuration module 14 may preconfigure two identifiers, that is, the first identifier and the second identifier, for the initial P-CSCF, where the first identifier includes the IP address of the initial P-CSCF, and the second identifier includes the IP address of the P-CSCF except the initial P-CSCF. The first identifier is an IP address advertised by the initial P-CSCF, and the second identifier is an IP address of another P-CSCF, except the initial P-CSCF, in the P-CSCF pool. When the processing module 12 detects that the initial P-CSCF is faulty, the notification message may be directly sent to the available P-CSCF according to the second identifier configured by the configuration module 14.

Further, optionally, as shown in FIG. 10, the processing module 12 may specifically include:

an acquiring unit 121, configured to acquire the first identifier and the second identifier that are configured for the initial P-CSCF;

a detection unit 122, configured to: if it is detected, according to the acquired first identifier, that the initial P-CSCF corresponding to the first identifier is faulty, use a P-CSCF corresponding to the second identifier as the available P-CSCF; and a processing unit 123, configured to send the notification message to the available P-CSCF according to the second identifier.

That is, the processing module 12 sends the notification message according to the second identifier configured by the configuration module 14.

Further, optionally, the allocation module 13 is specifically configured to send the called request to the re-registered P-CSCF, so that the re-registered P-CSCF sends the called request to the user terminal to perform the called service.

In this embodiment of the present disclosure, after a called request is received, if it is detected that a P-CSCF with which a user terminal that is of a called party and corresponds to the called request currently registers is faulty, a corresponding message that carries a redundancy identifier is generated to finally trigger the terminal to re-register with a P-CSCF, and a called service of the user terminal is borne in the re-registered P-CSCF, which avoids problems in the prior art that a dual-host fault is caused because heartbeat detection needs to be performed between a primary network element and a secondary network element and processing is complex because a same IP needs to be presented to the outside. In addition, fault recovery can be quickly completed in an existing network architecture.

Figure 11A:
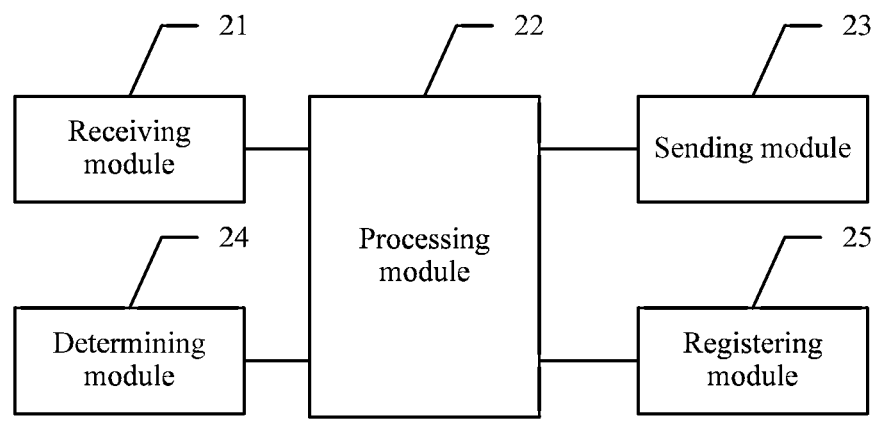
FIG. 11A is a schematic structural diagram of Embodiment 2 of an apparatus for recovering a called service of a terminal according to the present disclosure.

Referring to FIG. 11A, FIG. 11A is a schematic flowchart of Embodiment 2 of an apparatus for recovering a called service of a terminal according to the present disclosure. The apparatus in this embodiment of the present disclosure may be a P-CSCF. Specifically, the apparatus includes:

a receiving module 21, configured to receive a notification message that is sent by a serving-call session control function S-CSCF entity and carries a user name, where the user name includes an identifier of a user terminal corresponding to a called request received by the S-CSCF, that is, an identifier of a user terminal of a called party, and may be specifically an IP address, a user service permission, other user configuration information, and the like of the user terminal used as the called party;

a processing module 22, configured to generate, if it is found, by means of parsing, that the notification message further includes a redundancy identifier, a reselection request that carries a P-CSCF re-select flag and the user name; and a sending module 23, configured to send the reselection request to a policy and charging rules function PCRF entity that manages the user terminal indicated by the user name, so that the PCRF instructs, according to the P-CSCF re-select flag, the user terminal indicated by the user name to reselect a P-CSCF to bear a called service of the user terminal.

The notification message that carries the redundancy identifier is generated by the S-CSCF when a P-CSCF with which the user terminal corresponding to a received called request registers is faulty, and the redundancy identifier is used to instruct to trigger the user terminal to re-register with a P-CSCF. That is, the notification message is generated when the initial P-CSCF of the user terminal of the called party is faulty.

For a process in which the S-CSCF generates the notification message that includes the redundancy identifier, refer to descriptions in Embodiment 1 of the foregoing apparatus.

However, if the notification message received by the receiving module 21 includes no redundancy identifier, the processing module 22 of the P-CSCF may bear a called service of a corresponding user terminal according to the user name in the notification message.

The reselection request that is generated by the processing module 22 and carries the P-CSCF re-select flag and the user name may be specifically an STR, where the STR carries a defined P-CSCF re-select flag; the sending module 23 sends the STR to the PCRF.

Specifically, when sending the reselection request, the sending module 23 may not know the PCRF to which the user terminal corresponding to the user name belongs. In this case, further, optionally, the sending module 23 is specifically configured to send the reselection request to a Diameter routing agent DRA, so that the DRA sends, according to the user name in the reselection request, the reselection request to the PCRF that manages the user terminal indicated by the user name. That is, the sending module 23 may first send the STR to the DRA, and then, the DRA determines, according to the user name in the STR, the PCRF of the user terminal corresponding to the user name.

Further, optionally, as shown in FIG. 11A, the apparatus may specifically include:

a determining module 24, configured to: determine whether the user terminal indicated by the user name registers with a local end, and when a result of the determining is that the user terminal does not register with the local end, instruct the processing module 22 to perform the generating, if it is found, by means of parsing, that the notification message further includes a redundancy identifier, a reselection request that carries a P-CSCF re-select flag and the user name.

However, if the determining result of the determining module 24 is that the user terminal has registered with the local end, the current P-CSCF may directly send a registration complete message to the S-CSCF, and register a user name of the user terminal and a host name of the local end in the S-CSCF, so that the S-CSCF sends the called request received to the local end, and the local end bears the called service of the user terminal.

That is, only when the user terminal does not register with the available P-CSCF, whether to initiate a recovery procedure is determined, so that the user terminal re-registers with a P-CSCF.

The user terminal may be instructed, by using the PCRF that manages the user terminal and by using a notification path of a gateway connected to the user terminal, to re-register with a new P-CSCF, so that the S-CSCF delivers the called request of the user terminal to the new P-CSCF, and the new P-CSCF bears the called service of the user terminal. After the user terminal is instructed to re-register with the new P-CSCF, the user terminal may select the available P-CSCF. Therefore, further, optionally, as shown in FIG. 11A, the apparatus may further include:

a registering module 25, configured to: when a registration request of the user terminal is received, send a registration complete message to an S-CSCF to which the user terminal belongs, to complete registration of the user terminal.

The user terminal may complete registration with the current P-CSCF by using an existing registration procedure. After determining that the user terminal successfully registers with the P-CSCF, the registering module 25 sends the registration complete message to a front-end S-CSCF, so as to instruct the front-end S-CSCF to deliver the received called request to the current P-CSCF to bear the called service of the user terminal.

Figure 11B:
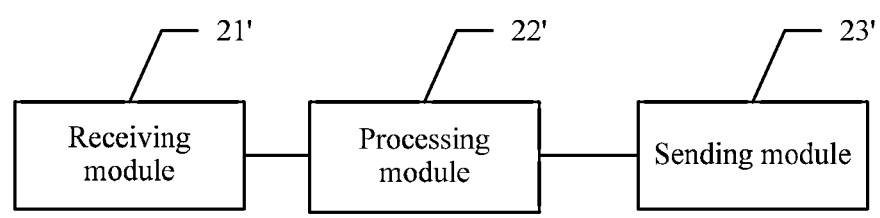
FIG. 11B is a schematic structural diagram of an apparatus for recovering a called service of a terminal according to an embodiment of the present disclosure.

The present disclosure further provides an apparatus for recovering a called service of a terminal, as shown in FIG. 11B. The apparatus shown in FIG. 11B may be a P-CSCF, and the apparatus includes:

a receiving module 21', configured to receive a called request of a user terminal, where the receiving module 21' may be specifically configured to receive a called request of the user terminal that is sent by an S-CSCF or an IBCF;

a processing module 22', configured to: when the receiving module 21' receives the called request, determine that no registration data of a called user is stored; and a sending module 23', configured to: after the processing module 22' determines that no registration data of the called user is stored, send, to a PCRF that manages the user terminal, a request for triggering the user terminal to re-initiate IMS registration.

Optionally, the sending module 23' may be specifically configured to send, to the PCRF, a request that carries a re-registration identifier, where the re-registration identifier is used to trigger the user terminal to re-initiate the IMS registration. In a possible implementation manner, the request that carries the re-registration identifier may be an STR or an AAR.

Optionally, the processing module 22' is specifically configured to determine that the apparatus shown in FIG. 11B does not store the registration data of the called user.

In this embodiment of the present disclosure, when a P-CSCF with which a user terminal currently registers is faulty, the terminal is finally triggered, according to a message that carries a redundancy identifier, to re-register with a P-CSCF, and a called service of the user terminal is borne in the re-registered P-CSCF, which avoids problems in the prior art that a dual-host fault is caused because heartbeat detection needs to be performed between a primary network element and a secondary network element and processing is complex because a same IP needs to be presented to the outside. In addition, fault recovery can be quickly completed in an existing network architecture.

Figure 12:
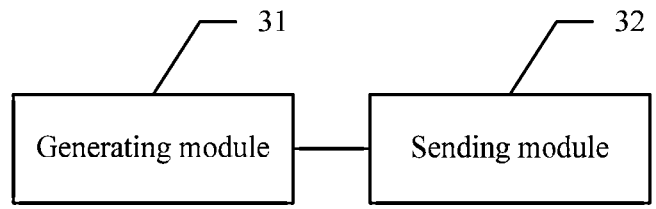
FIG. 12 is a schematic structural diagram of Embodiment 3 of an apparatus for recovering a called service of a terminal according to the present disclosure.

Referring to FIG. 12, FIG. 12 is a schematic flowchart of Embodiment 3 of an apparatus for recovering a called service of a terminal according to the present disclosure. The apparatus in this embodiment of the present disclosure may be a PCRF. Specifically, the apparatus includes:

a generating module 31, configured to generate a registration triggering request when a reselection request that is sent by a P-CSCF and carries a P-CSCF re-select flag and a user name is received, where the user name includes an identifier of a user terminal corresponding to a called request received by an S-CSCF, that is, an identifier of a user terminal of a called party, and may be specifically an IP address, a user service permission, other user configuration information, and the like of the user terminal used as the called party; and a sending module 32, configured to send the generated registration triggering request to a gateway connected to the user terminal indicated by the user name, so that the gateway triggers the user terminal indicated by the user name to re-register with a P-CSCF to bear a called service of the user terminal.

The reselection request is generated by the P-CSCF according to a notification message that is sent by the S-CSCF and carries the user name and a redundancy identifier, where the redundancy identifier is used to instruct to trigger the user terminal indicated by the user name to re-register with the P-CSCF.

After receiving the reselection request such as the STR that carries the P-CSCF re-select flag, the generating module 31 needs to perform a procedure of recovering the called service of the user terminal corresponding to the user name, that is, generating the registration triggering request and sending the registration triggering request to the gateway of the user terminal corresponding to the user name. The gateway may be a P-GW or an S-GW. The gateway directly triggers the user terminal to reselect a new P-CSCF.

Further, optionally, the generating module 32 is specifically configured to: when the reselection request that is sent by the P-CSCF and carries the P-CSCF re-select flag and the user name is received, generate a registration triggering request that carries a session release message.

The session release message is used to instruct the gateway connected to the user terminal indicated by the user name to request a mobility management entity MME to delete a user bearer of a user terminal.

The registration triggering request may be an RAR (Re-Auth-Request, re-authentication request) that carries a Session-Release-Cause AVP (Attribute Length Value, attribute-value pair), that is, an attribute field of Session-Release-Cause and a field value are carried in the RAR to instruct the gateway to request to delete all bearers of the user terminal. The gateway directly requests to release an IMS PDN of the user terminal corresponding to the user name.

The user terminal loses a connection after the MME deletes the IMS PDN. The user terminal detects an access failure, and automatically performs a new registration procedure to complete registration with the P-CSCF and the like, to implement network accessing. The user terminal selects an available third P-CSCF and initiates SIP initial registration with the third P-CSCF. After receiving a registration request of the user, the third P-CSCF sends a message to an S-CSCF to which the user terminal belongs, to complete the registration request. The third P-CSCF may determine, by using an I-CSCF, the S-CSCF to which the user terminal belongs, and then send a registration complete message to the found S-CSCF to which the user terminal belongs, to complete the registration request. Then, the S-CSCF delivers the called request to the third P-CSCF to bear the called service.

Alternatively, optionally, the generating module 32 is specifically configured to: when the reselection request that is sent by the P-CSCF and carries the P-CSCF re-select flag and the user name is received, generate a registration triggering request that carries update P-CSCF address information.

The update P-CSCF address information is used to instruct the gateway connected to the user terminal indicated by the user name to generate a list of available P-CSCF addresses and send the list of the available P-CSCF addresses to the user terminal indicated by the user name.

The registration triggering request is an RAR that carries an update P-CSCF address request. After receiving the RAR, the gateway sends an update PDP context Update PDP Context message to the user terminal, so that the user terminal completes re-registration. After receiving the Update PDP Context, the user terminal updates a local P-CSCF list according to the list of the available P-CSCF addresses in the Update PDP Context, checks whether an initial P-CSCF with which a local end registers is in the list, and if not, the user terminal initiates a procedure of re-registering with a P-CSCF, which may be specifically selecting an available third P-CSCF from a new P-CSCF list delivered by the gateway and registering with the third P-CSCF to bear the called service of the user terminal. The third P-CSCF may determine, by using an I-CSCF, an S-CSCF to which the user terminal belongs, and then send a registration complete message to the found S-CSCF to which the user terminal belongs, to complete the registration request. Then, the S-CSCF delivers the called request to the third P-CSCF to bear the called service.

In this embodiment of the present disclosure, when a P-CSCF with which a user terminal currently registers is faulty, the terminal is finally triggered, according to a message that carries a redundancy identifier, to re-register with a P-CSCF, and a called service of the user terminal is borne in the re-registered P-CSCF, which avoids problems in the prior art that a dual-host fault is caused because heartbeat detection needs to be performed between a primary network element and a secondary network element and processing is complex because a same IP needs to be presented to the outside. In addition, fault recovery can be quickly completed in an existing network architecture.

Figure 13:
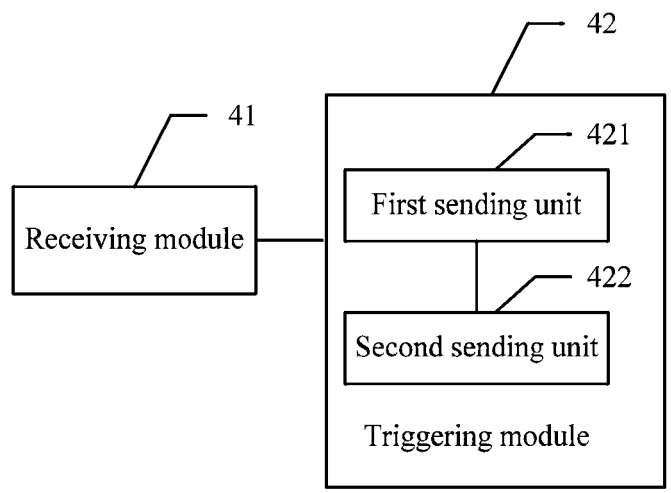
FIG. 13 is a schematic structural diagram of Embodiment 4 of an apparatus for recovering a called service of a terminal according to the present disclosure.

Referring to FIG. 13, FIG. 13 is a schematic flowchart of Embodiment 4 of an apparatus for recovering a called service of a terminal according to the present disclosure. The apparatus in this embodiment of the present disclosure may be a P-GW, an S-GW, or another gateway. Specifically, the apparatus includes:

a receiving unit 41, configured to receive a registration triggering request that is sent by a policy and charging rules function PCRF entity and carries a user name; and a triggering module 42, configured to trigger a user terminal indicated by the user name to re-register with a P-CSCF to bear a called service of the user terminal.

The registration triggering request is generated when the PCRF receives a reselection request that is sent by a P-CSCF and carries a P-CSCF re-select flag and the user name, and the reselection request is generated by the P-CSCF according to a notification message that is sent by an S-CSCF and carries the user name and a redundancy identifier, where the redundancy identifier is used to instruct to trigger the user terminal indicated by the user name to re-register with the P-CSCF.

Further, optionally, as shown in FIG. 13, the triggering module 42 may specifically include:

a first sending unit 421, configured to: when the registration triggering request carries a session release message, send, to a mobility management entity MME, a release request that carries the user name, so that the MME deletes a user bearer of the user terminal indicated by the user name; or a second sending unit 422, configured to: when the registration triggering request carries update P-CSCF address information, acquire a list of available P-CSCF addresses and send the list of the available P-CSCF addresses to the user terminal indicated by the user name, so that the user terminal selects a P-CSCF from the list of the available P-CSCF addresses and registers with the selected P-CSCF.

After a gateway receives an RAR that is sent by the PCRF and carries a Session-Release-Cause AVP, the first sending unit 421 instructs the MME to delete an IMS PDN of a user, and triggers the user terminal to re-register with a new P-CSCF. However, when the gateway receives an RAR that is sent by the PCRF and carries an update P-CSCF address request, the second sending unit 422 acquires an Update PDP Context message and sends the Update PDP Context message to the user terminal to trigger the user terminal to update a local P-CSCF list according to the list of the available P-CSCF addresses in the Update PDP Context message, and after determining that an updated local P-CSCF list does not include an initial P-CSCF with which a local end has registered, selects a new P-CSCF and registers with the selected P-CSCF to complete re-registration.

In this embodiment of the present disclosure, when a P-CSCF with which a user terminal currently registers is faulty, the terminal is finally triggered, according to a message that carries a redundancy identifier, to re-register with a P-CSCF, and a called service of the user terminal is borne in the re-registered P-CSCF, which avoids problems in the prior art that a dual-host fault is caused because heartbeat detection needs to be performed between a primary network element and a secondary network element and processing is complex because a same IP needs to be presented to the outside. In addition, fault recovery can be quickly completed in an existing network architecture.

Figure 14:
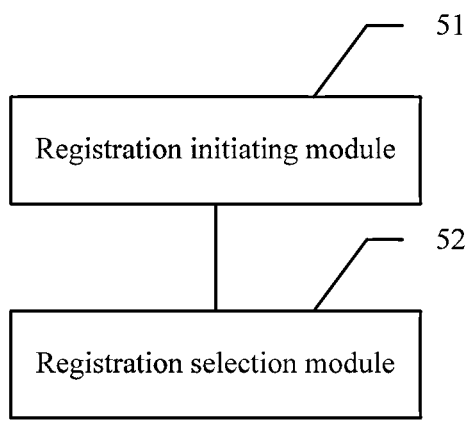
FIG. 14 is a schematic structural diagram of Embodiment 5 of an apparatus for recovering a called service of a terminal according to the present disclosure.

Referring to FIG. 14, FIG. 14 is a schematic structural diagram of Embodiment 5 of an apparatus for recovering a called service of a terminal according to the present disclosure. The apparatus in this embodiment of the present disclosure may be a user terminal that is used as a called party and corresponds to a called request. Specifically, the apparatus includes:

a registration initiating module 51, configured to: when an access failure is detected, initiate a registration request for registering with a P-CSCF, so that a re-registered P-CSCF bears a called service when an initial P-CSCF is faulty; and a registration selection module 52, configured to: when a list of available P-CSCF addresses that is sent by a gateway is received, select a P-CSCF from the list of the available P-CSCF addresses and register with the selected P-CSCF, so that the re-registered P-CSCF bears the called service when the initial P-CSCF is faulty.

The user terminal loses a connection after an MME deletes an IMS PDN. The registration initiating module 51 detects that the access failure, and automatically performs a new registration procedure to complete registration with the P-CSCF and the like, to implement network accessing. The registration initiating module 51 selects an available third P-CSCF, and initiates SIP initial registration with the third P-CSCF. After receiving a registration request of a user terminal, the third P-CSCF sends a message to an S-CSCF to which the user terminal belongs, to complete the registration request. The third P-CSCF may determine, by using an I-CSCF, the S-CSCF to which the user terminal belongs, and then send a registration complete message to the found S-CSCF to which the user terminal belongs, to complete the registration request. Then, the S-CSCF delivers the called request to the third P-CSCF to bear the called service.

Further, optionally, as shown in FIG. 14, the registration selection module 52 may specifically include:

a determining unit, configured to: when the list of the available P-CSCF addresses that is sent by the gateway is received, determine whether the list of the available P-CSCF addresses includes a host name of the initial P-CSCF with which the user terminal currently registers; and a registration selecting unit, configured to: if the list of the available P-CSCF addresses does not include the host name of the initial P-CSCF, select the P-CSCF from the list of the available P-CSCF addresses and register with the selected P-CSCF.

The registration triggering request is an RAR that carries an update P-CSCF address request. After receiving the RAR, the gateway sends an Update PDP Context message to the user terminal, so that the user terminal completes re-registration. After receiving the Update PDP Context, the registration selection module 52 updates a local P-CSCF list according to the list of the available P-CSCF addresses in the Update PDP Context, checks whether an initial P-CSCF with which a local end registers is in the list, and if not, the user terminal initiates a procedure of re-registering with a P-CSCF, which may be specifically selecting the available third P-CSCF3 from a new P-CSCF list delivered by the gateway and registering with the third P-CSCF3 to bear the called service of the user terminal. The third P-CSCF may determine, by using an I-CSCF, the S-CSCF to which the user terminal belongs, and then send a registration complete message to the found S-CSCF to which the user terminal belongs, to complete the registration request. Then, the S-CSCF delivers the called request to the third P-CSCF to bear the called service.

In this embodiment of the present disclosure, when a P-CSCF with which a user terminal currently registers is faulty, the terminal can re-register with a new P-CSCF according to a structure, on a network side, for recovery processing based on a message that carries a redundancy identifier, and carry a called service of the user terminal in the new P-CSCF, which avoids problems in the prior art that a dual-host fault is caused because heartbeat detection needs to be performed between a primary network element and a secondary network element and processing is complex because a same IP needs to be presented to the outside. In addition, fault recovery can be quickly completed in an existing network architecture.

Figure 15:
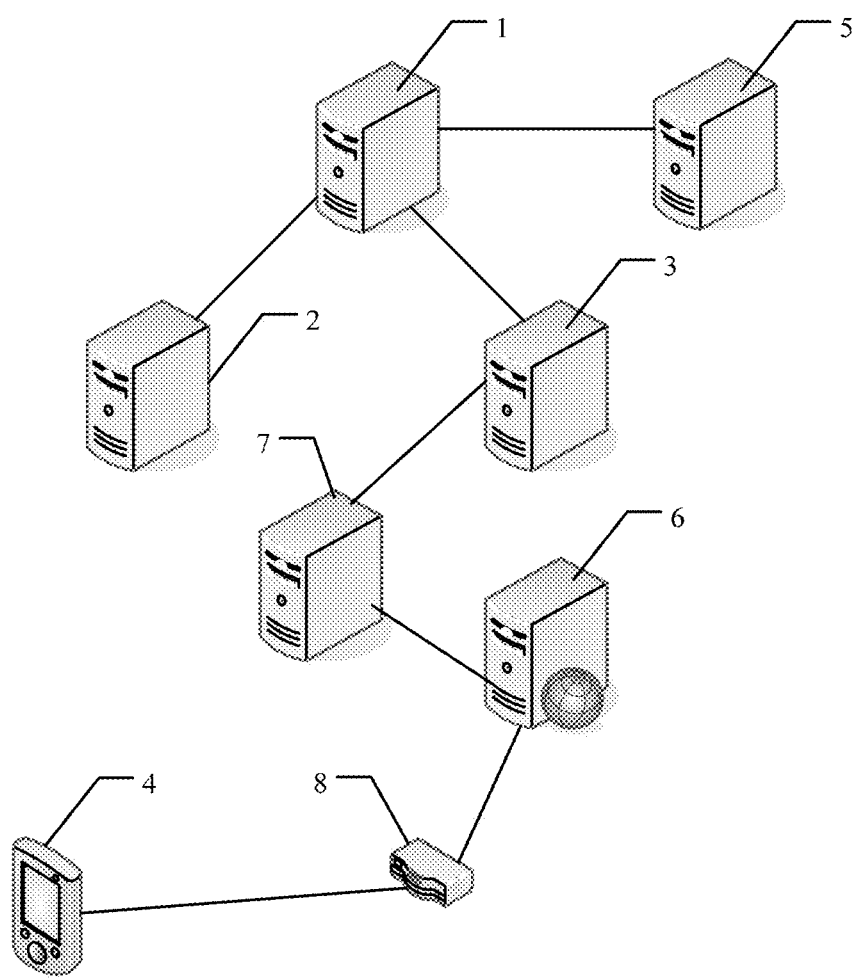
FIG. 15 is a schematic structural diagram of a system for recovering a called service of a terminal according to an embodiment of the present disclosure.

Referring to FIG. 15, FIG. 15 is a schematic structural diagram of a system for recovering a called service of a terminal according to an embodiment of the present disclosure. The system in this embodiment of the present disclosure may specifically include: a serving-call session control function S-CSCF1 entity, at least two proxy-call session control function P-CSCF entities, and a user terminal 4, where the at least two P-CSCFs include a second P-CSCF3 and a first P-CSCF2 with which the user terminal currently registers.

The S-CSCF is configured to: when a called request of the user terminal 4 is received, query the first P-CSCF2 with which the user terminal 4 currently registers; and if it is detected that the first P-CSCF2 is faulty, select the second P-CSCF3, and send, to the second P-CSCF, a notification message that carries a redundancy identifier, where the redundancy identifier is used to instruct the available P-CSCF to trigger the user terminal 4 to re-register with the P-CSCF.

The second P-CSCF3 is configured to trigger the user terminal 4 to re-register with the P-CSCF.

The S-CSCF is further configured to: when a registration complete message sent by the P-CSCF with which the user terminal 4 re-registers is received, deliver the called request to the re-registered P-CSCF to bear a called service of the user terminal 4.

The second P-CSCF specifically triggers, by using a policy and charging rules function PCRF entity, the user terminal to re-register with the P-CSCF.

Further, optionally, as shown in FIG. 15, the system further includes a DNS server 5.

The S-CSCF is further configured to configure, on the DNS server 5, a first identifier and a second identifier according to a host name of the first P-CSCF2, where the first identifier includes an IP address of the first P-CSCF2, and the second identifier includes an IP address of the second P-CSCF3.

Further, optionally, as shown in FIG. 15, the system may further include a policy and charging rules function PCRF entity 6.

The second P-CSCF3 is configured to: generate, according to the notification message that is sent by the S-CSCF and carries a user name and the redundancy identifier, a reselection request that carries a P-CSCF re-select flag and the user name, and send the reselection request to the PCRF6.

The PCRF6 is configured to instruct, according to the P-CSCF re-select flag, the user terminal 4 indicated by the user name to reselect a P-CSCF to bear the called service of the user terminal 4.

Further, optionally, as shown in FIG. 15, the system may further include a Diameter routing agent DRA7.

The DRA7 is configured to: receive the reselection request sent by the second P-CSCF3, and send the reselection request to the PCRF6.

Further, optionally, as shown in FIG. 15, the system may further include a gateway 8 connected to the user terminal 4.

The PCRF6 is specifically configured to: generate a registration triggering request when the reselection request that is sent by the P-CSCF and carries the P-CSCF re-select flag and the user name is received, and send the registration triggering request to the gateway 8.

The gateway 8 is configured to trigger, according to the registration triggering request, the user terminal 4 indicated by the user name to re-register with the P-CSCF to bear the called service of the user terminal 4.

Further, the gateway 8 is specifically configured to: when the registration triggering request carries a session release message, send, to a mobility management entity MME, a release request that carries the user name, so that the MME deletes a user bearer of the user terminal 4 indicated by the user name; or when the registration triggering request carries update P-CSCF address information, acquire a list of available P-CSCF addresses and send the list of the available P-CSCF addresses to the user terminal 4 indicated by the user name, so that the user terminal 4 selects a P-CSCF from the list of the available P-CSCF addresses and registers with the selected P-CSCF.

Further, the user terminal 4 is further configured to: when an access failure is detected, initiate a registration request for registering with a P-CSCF, so that a re-registered P-CSCF bears the called service when the initial P-CSCF is faulty; or when the list of the available P-CSCF addresses that is sent by the gateway 8 is received, select a P-CSCF from the list of the available P-CSCF addresses, and register with the selected P-CSCF, so that the re-registered P-CSCF bears the called service when the initial P-CSCF is faulty.

Specifically, for specific implementation of the foregoing user terminal 4, refer to descriptions of the user terminal that is used as the called party and corresponds to the called request in the foregoing method embodiments and apparatus embodiments; for specific implementation of the foregoing S-CSCF1, refer to descriptions of the S-CSCF in the foregoing method embodiments and apparatus embodiments; for specific implementation of the foregoing first P-CSCF2 and the foregoing second P-CSCF3, refer to descriptions of the faulty P-CSCF and the available P-CSCF in the foregoing method embodiments and apparatus embodiments; for specific implementation of the foregoing PCRF6, refer to descriptions of the PCRF in the foregoing method embodiments and apparatus embodiments; the foregoing gateway 8 may be an S-GW or a P-GW, and refer to descriptions of the gateway in the foregoing method embodiments and apparatus embodiments. Details are not described herein.

In this embodiment of the present disclosure, when a P-CSCF with which a user terminal currently registers is faulty, the terminal is finally triggered, according to a message that carries a redundancy identifier, to re-register with a P-CSCF, and a called service of the user terminal is borne in the re-registered P-CSCF, which avoids problems in the prior art that a dual-host fault is caused because heartbeat detection needs to be performed between a primary network element and a secondary network element and processing is complex because a same IP needs to be presented to the outside. In addition, fault recovery can be quickly completed in an existing network architecture.

Figure 16:
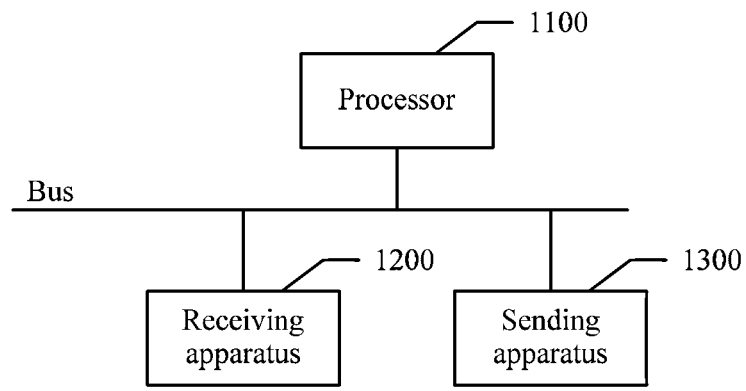
FIG. 16 is a schematic structural diagram of a network device according to an embodiment of the present disclosure.

Specifically, an embodiment of the present disclosure further provides a network device. Specifically, refer to a schematic structural diagram of the network device shown in FIG. 16. The network device may be specifically an S-CSCF or an IBCF, and may include a receiving apparatus 1200, a processor 1100, and a sending apparatus 1300, where the processor 1100 is configured to perform:

when the receiving apparatus 1200 receives a called request of a user terminal, querying an initial proxy-call session control function P-CSCF entity with which the user terminal currently registers; and if it is detected that the initial P-CSCF is faulty, selecting an available P-CSCF and sending a notification message to the available P-CSCF by using the sending apparatus 1300, to trigger the user terminal to re-register with the P-CSCF.

In a possible implementation manner, the processor 1100 may be specifically configured to: after selecting the available P-CSCF, send, to the available P-CSCF by using the sending apparatus 1300, a notification message that carries a redundancy identifier, where the redundancy identifier is used to instruct the available P-SCCF to trigger the user terminal to re-register with the P-CSCF. In another possible implementation manner, the processor 1100 may be specifically configured to: after selecting the available P-CSCF, send the called request of the user terminal to the available P-CSCF by using the sending apparatus 1300, so as to trigger, when the available P-CSCF determines that no registration data of a called user is stored, the user terminal to re-initiate IMS registration.

The processor 1100 may further be configured to: when the receiving apparatus 1200 receives a registration complete message sent by the P-CSCF with which the user terminal re-registers, deliver the called request to the re-registered P-CSCF by using the sending apparatus 1300, to bear a called service of the user terminal.

The available P-CSCF specifically triggers, by using a PCRF, the user terminal to re-register with the P-CSCF.

Further, optionally, before performing the selecting an available P-CSCF and sending a notification message to the available P-CSCF, if it is detected that the initial P-CSCF is faulty, the processor 1100 is further configured to perform:

configuring a first identifier and a second identifier for the initial P-CSCF, where the first identifier includes an IP address of the initial P-CSCF, and the second identifier includes an IP address of a P-CSCF except the initial P-CSCF.

Further, optionally, when performing the configuring a first identifier and a second identifier for the initial P-CSCF, the processor 1100 is specifically configured to perform:

configuring, on a domain name system DNS server, the first identifier and the second identifier according to a host name of the initial P-CSCF.

Further, optionally, when performing the selecting an available P-CSCF and sending a notification message to the available P-CSCF, if it is detected that the initial P-CSCF is faulty, the processor 1100 is specifically configured to perform:

acquiring the first identifier and the second identifier that are configured for the initial P-CSCF;

if it is detected, according to the acquired first identifier, that the initial P-CSCF corresponding to the first identifier is faulty, using a P-CSCF corresponding to the second identifier as the available P-CSCF; and sending the notification message to the available P-CSCF according to the second identifier.

Further, optionally, when performing the delivering the called request to the re-registered P-CSCF to the called service of the user terminal, the processor 1100 is specifically configured to send the called request to the re-registered P-CSCF, so that the re-registered P-CSCF sends the called request to the user terminal to perform the called service.

In this embodiment of the present disclosure, after a called request is received, if it is detected that a P-CSCF with which a user terminal that is used as a called party and corresponds to the called request currently registers is faulty, a corresponding message that carries a redundancy identifier is generated to finally trigger the terminal to re-register with a P-CSCF, and a called service of the user terminal is borne in the re-registered P-CSCF, which avoids problems in the prior art that a dual-host fault is caused because heartbeat detection needs to be performed between a primary network element and a secondary network element and processing is complex because a same IP needs to be presented to the outside. In addition, fault recovery can be quickly completed in an existing network architecture.

Figure 17A:
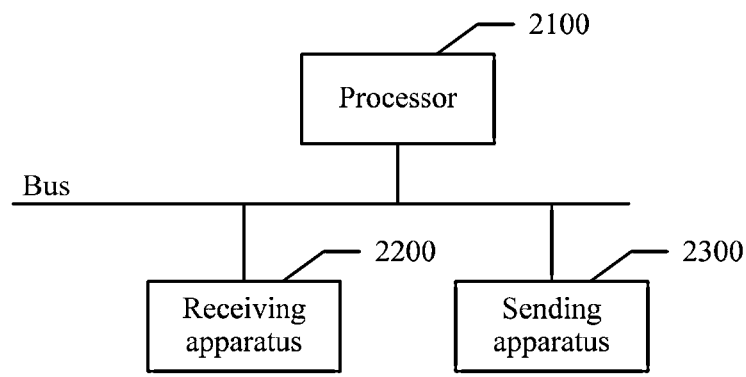
FIG. 17A is a schematic structural diagram of another network device according to an embodiment of the present disclosure.

Specifically, an embodiment of the present disclosure further provides another network device. Specifically, refer to a schematic structural diagram of the another network device shown in FIG. 17A. The network device may be specifically a P-CSCF, and may include a receiving apparatus 2200, a processor 2100, and a sending apparatus 2300, where the processor 2100 is configured to perform:

receiving, by using the receiving apparatus 2200, a notification message that is sent by a serving-call session control function S-CSCF entity and carries a user name;

generating, if it is found, by means of parsing, that the notification message further includes a redundancy identifier, a reselection request that carries a P-CSCF re-select flag and the user name; and sending, by using the sending apparatus 2300, the reselection request to a policy and charging rules function PCRF entity that manages a user terminal indicated by the user name, so that the PCRF instructs, according to the P-CSCF re-select flag, the user terminal indicated by the user name to reselect a P-CSCF to bear a called service of the user terminal.

The notification message that carries the redundancy identifier is generated by the S-CSCF when a P-CSCF with which the user terminal corresponding to a received called request registers is faulty, and the redundancy identifier is used to instruct to trigger the user terminal to re-register with a P-CS CF.

Further, optionally, when performing the sending the reselection request to a policy and charging rules function PCRF entity that manages a user terminal indicated by the user name, the processor 2100 is configured to perform:

sending the reselection request to a Diameter routing agent DRA, so that the DRA sends, according to the user name in the reselection request, the reselection request to the PCRF that manages the user terminal indicated by the user name.

Further, optionally, before performing the generating, if it is found, by means of parsing, that the notification message further includes a redundancy identifier, a reselection request that carries a P-CSCF re-select flag and the user name, the processor 2100 is further configured to perform:

determining whether the user terminal indicated by the user name registers with a local end; and if the user terminal does not register with the local end, performing the generating, if it is found, by means of parsing, that the notification message further includes a redundancy identifier, a reselection request that carries a P-CSCF re-select flag and the user name.

Further, optionally, the processor 2100 is further configured to perform:

when a registration request of the user terminal is received, sending a registration complete message to an S-CSCF to which the user terminal belongs, to complete registration of the user terminal.

In this embodiment of the present disclosure, when a P-CSCF with which a user terminal currently registers is faulty, the terminal is finally triggered, according to a message that carries a redundancy identifier, to re-register with a P-CSCF, and a called service of the user terminal is borne in the re-registered P-CSCF, which avoids problems in the prior art that a dual-host fault is caused because heartbeat detection needs to be performed between a primary network element and a secondary network element and processing is complex because a same IP needs to be presented to the outside. In addition, fault recovery can be quickly completed in an existing network architecture.

Figure 17B:
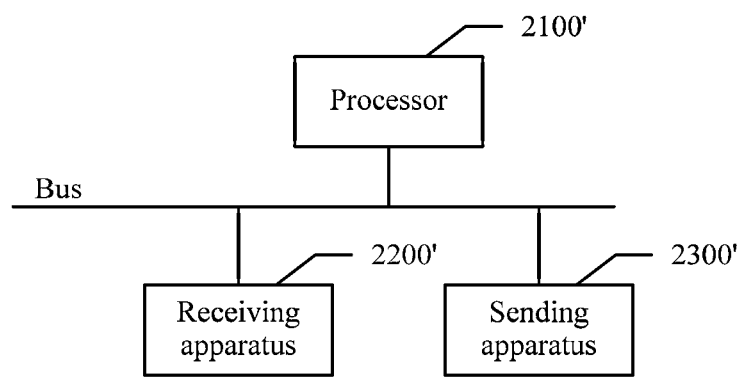
FIG. 17B is a schematic structural diagram of an apparatus for recovering a called service of a terminal according to an embodiment of the present disclosure.

The present disclosure further provides an apparatus for recovering a called service of a terminal, as shown in FIG. 17B. The apparatus shown in FIG. 17B may be a P-CSCF. The apparatus includes a receiving apparatus 2200', a processor 2100', and a sending apparatus 2300', where the processor 2100' is configured to perform:

receiving a called request of a user terminal by using the receiving apparatus 2200';

determining that no registration data of a called user is stored; and sending, to a PCRF that manages the user terminal and by using the sending apparatus 2300', a request for triggering the user terminal to re-initiate IMS registration.

The processor 2100' receives, by using the receiving apparatus 2200', a called request of the user terminal that is sent by an S-CSCF or an IBCF.

Optionally, the processor 2100' may be specifically configured to send, to the PCRF by using the sending apparatus 2300', a request that carries a re-registration identifier, where the re-registration identifier is used to trigger the user terminal to re-initiate the IMS registration. In a possible implementation manner, the request that carries the re-registration identifier may be an STR or an AAR.

Optionally, when determining that no registration data of a called user is stored, the processor 2100' is specifically configured to determine that the apparatus shown in FIG. 17B does not store the registration data of the called user.

Figure 18:
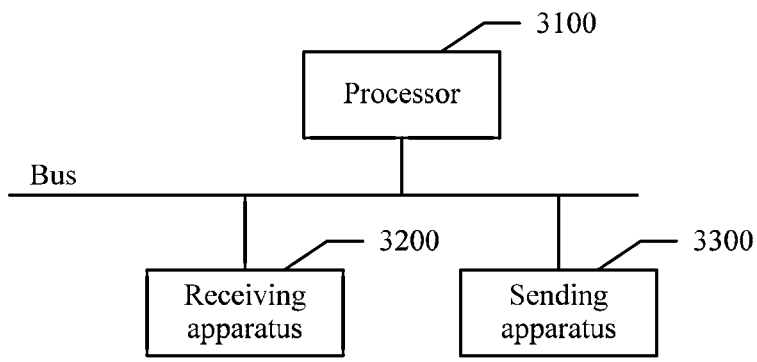
FIG. 18 is a schematic structural diagram of still another network device according to an embodiment of the present disclosure.

Specifically, an embodiment of the present disclosure further provides still another network device. Specifically, refer to a schematic structural diagram of the still another network device shown in FIG. 18. The network device may be specifically a PCRF, and may include a receiving apparatus 3200, a processor 3100, and a sending apparatus 3300, where the processor 3100 is configured to perform:

generating a registration triggering request when the receiving apparatus 3200 receives a reselection request that is sent by a P-CSCF and carries a P-CSCF re-select flag and a user name; and sending, by using the sending apparatus 3300, the generated registration triggering request to a gateway connected to a user terminal indicated by the user name, so that the gateway triggers the user terminal indicated by the user name to re-register with a P-CSCF to bear a called service of the user terminal.

The reselection request is generated by the P-CSCF according to a notification message that is sent by an S-CSCF and carries the user name and a redundancy identifier, where the redundancy identifier is used to instruct to trigger the user terminal indicated by the user name to re-register with the P-CSCF.

Further, optionally, when performing the generating a registration triggering request when a reselection request that is sent by a P-CSCF and carries a P-CSCF re-select flag and a user name is received, the processor 3100 is specifically configured to perform:

when the reselection request that is sent by the P-CSCF and carries the P-CSCF re-select flag and the user name is received, generating a registration triggering request that carries a session release message, where the session release message is used to instruct the gateway connected to the user terminal indicated by the user name to request a mobility management entity (MME) to delete a user bearer of a user terminal.

Further, optionally, when performing the generating a registration triggering request when a reselection request that is sent by a P-CSCF and carries a P-CSCF re-select flag and a user name is received, the processor 3100 is specifically configured to perform:

when the reselection request that is sent by the P-CSCF and carries the P-CSCF re-select flag and the user name is received, generating a registration triggering request that carries update P-CSCF address information, where the update P-CSCF address information is used to instruct the gateway connected to the user terminal indicated by the user name to generate a list of available P-CSCF addresses and send the list of the available P-CSCF addresses to the user terminal indicated by the user name.

In this embodiment of the present disclosure, when a P-CSCF with which a user terminal currently registers is faulty, the terminal is finally triggered, according to a message that carries a redundancy identifier, to re-register with a P-CSCF, and a called service of the user terminal is borne in the re-registered P-CSCF, which avoids problems in the prior art that a dual-host fault is caused because heartbeat detection needs to be performed between a primary network element and a secondary network element and processing is complex because a same IP needs to be presented to the outside. In addition, fault recovery can be quickly completed in an existing network architecture.

Figure 19:
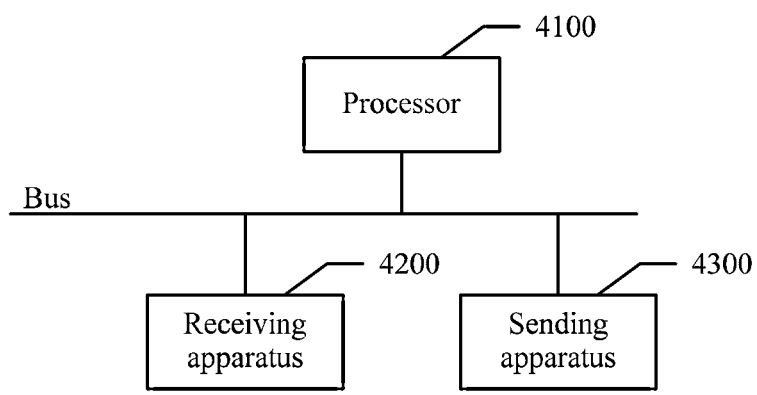
FIG. 19 is a schematic structural diagram of still another network device according to an embodiment of the present disclosure.

Specifically, an embodiment of the present disclosure further provides yet another network device. Specifically, refer to a schematic structural diagram of the still another network device shown in FIG. 19. The network device may be specifically an S-GW or a P-GW, and may include a receiving apparatus 4200, a processor 4100, and a sending apparatus 4300, where the processor 4100 is configured to perform:

when the receiving apparatus 4200 receives a registration triggering request that is sent by a policy and charging rules function PCRF entity and carries a user name, triggering a user terminal indicated by the user name to re-register with a P-CSCF to bear a called service of the user terminal, where the registration triggering request is generated when the PCRF receives a reselection request that is sent by a P-CSCF and carries a P-CSCF re-select flag and the user name, and the reselection request is generated by the P-CSCF according to a notification message that is sent by an S-CSCF and carries the user name and a redundancy identifier, where the redundancy identifier is used to instruct to trigger the user terminal indicated by the user name to re-register with the P-CSCF.

Further, optionally, when performing the triggering a user terminal indicated by the user name to re-register with a P-CSCF, the processor 4100 is configured to perform:

when the registration triggering request carries a session release message, sending, to a mobility management entity MME, a release request that carries the user name, so that the MME deletes a user bearer of the user terminal indicated by the user name; or when the registration triggering request carries update P-CSCF address information, acquiring a list of available P-CSCF addresses and sending the list of the available P-CSCF addresses to the user terminal indicated by the user name, so that the user terminal selects a P-CSCF from the list of the available P-CSCF addresses and registers with the selected P-CSCF.

In this embodiment of the present disclosure, when a P-CSCF with which a user terminal currently registers is faulty, the terminal is finally triggered, according to a message that carries a redundancy identifier, to re-register with a P-CSCF, and a called service of the user terminal is borne in the re-registered P-CSCF, which avoids problems in the prior art that a dual-host fault is caused because heartbeat detection needs to be performed between a primary network element and a secondary network element and processing is complex because a same IP needs to be presented to the outside. In addition, fault recovery can be quickly completed in an existing network architecture.

Figure 20:
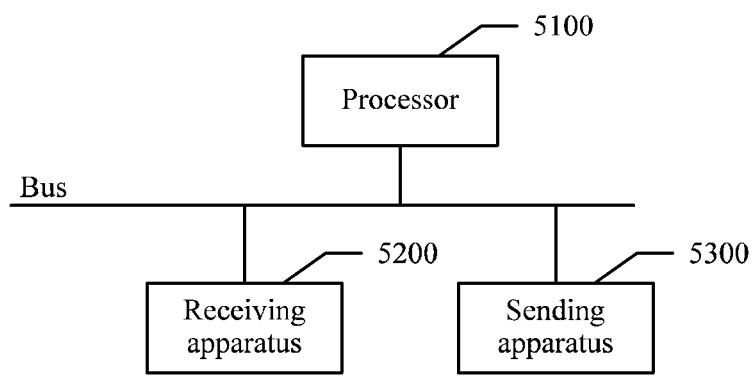
FIG. 20 is a schematic structural diagram of user equipment according to an embodiment of the present disclosure.

Specifically, an embodiment of the present disclosure further provides user equipment. Referring to a schematic structural diagram of the user equipment shown in FIG. 20, the user equipment includes a receiving apparatus S200, a processor S100, and a sending apparatus S300, where the processor S100 is configured to perform:

when detecting that an access failure, initiating, by using the sending apparatus S300, a registration request for registering with a P-CSCF, so that a re-registered P-CSCF bears a called service when an initial P-CSCF is faulty; and when the receiving apparatus S200 receives a list of available P-CSCF addresses that is sent by a gateway, selecting a P-CSCF from the list of the available P-CSCF addresses and registering with the selected P-CSCF, so that the re-registered P-CSCF bears the called service when the initial P-CSCF is faulty.

Further, optionally, when performing the selecting a P-CSCF from the list of the available P-CSCF addresses and registering with the selected P-CSCF, when a list of available P-CSCF addresses that is sent by a gateway is received, the processor S100 is specifically configured to perform:

when the list of the available P-CSCF addresses that is sent by the gateway is received, determining whether the list of the available P-CSCF addresses includes a host name of the initial P-CSCF with which a user terminal currently registers; and if the list of the available P-CSCF addresses does not include the host name of the initial P-CSCF, selecting the P-CSCF from the list of the available P-CSCF addresses and registering with the selected P-CSCF.

In this embodiment of the present disclosure, when a P-CSCF with which a user terminal currently registers is faulty, the terminal can re-register with a new P-CSCF according to a structure, on a network side, for recovery processing based on a message that carries a redundancy identifier, and carry a called service of the user terminal in the new P-CSCF, which avoids problems in the prior art that a dual-host fault is caused because heartbeat detection needs to be performed between a primary network element and a secondary network element and processing is complex because a same IP needs to be presented to the outside. In addition, fault recovery can be quickly completed in an existing network architecture.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (ROM), or a random access memory (RAM).

What is disclosed above is merely exemplary embodiments of the present disclosure, and certainly is not intended to limit the protection scope of the present disclosure. Therefore, equivalent variations made in accordance with the claims of the present disclosure shall fall within the scope of the present disclosure.

What is claimed is:

1. A method for recovering a called service of a user terminal comprising:
   receiving, by a gateway device, a notification message from a policy and charging rules function device, wherein the notification message includes an identifier to notify the gateway device to trigger the user terminal to re-initiate an IP multimedia subsystem (IMS) registration to recover the called service of the user terminal; and
   triggering, by the gateway device, the user terminal to re-initiate the IMS registration to recover the called service of the user terminal.

2. The method according to claim 1, wherein the identifier in the notification message is a proxy call session control function (P-CSCF) re-selection identifier, and the P-CSCF re-selection identifier is used to notify the gateway device to trigger the user terminal to re-initiate the IMS registration.

3. The method according to claim 1, wherein the triggering the user terminal to re-initiate the IMS registration comprising:
   sending, by the gateway device, a request to a mobility management device to delete a user bearer of the user terminal.

4. The method according to claim 1, wherein the triggering the user terminal to re-initiate the IMS registration comprising:
   sending, by the gateway device, a context message includes a list of proxy call session control function (P-CSCF) addresses to the user terminal.

5. The method according to claim 1, wherein the triggering the user terminal to re-initiate the IMS registration comprising:
   releasing, by the gateway device, an IMS packet data network connection of the user terminal.

6. The method according to claim 1, wherein the notification message is a Re-Auth-Request (RAR).

7. A gateway device comprising:
   a processor and a non-transitory computer-readable medium having computer-executable instructions stored thereon, which when executed by the processor cause the gateway device to:
   receive a notification message from a policy and charging rules function device, wherein the notification message includes an identifier to notify the gateway device to trigger the user terminal to re-initiate an IP multimedia subsystem (IMS) registration to recover a called service of a user terminal;
   trigger the user terminal to re-initiate the IMS registration to recover the called service of the user terminal.

8. The gateway device according to claim 7, wherein the identifier in the notification message is a proxy call session control function (P-CSCF) re-selection identifier, and the P-CSCF re-selection identifier is used to notify the gateway device to trigger the user terminal to re-initiate the IMS registration.

9. The gateway device according to claim 7, wherein the triggering the user terminal to re-initiate the IMS registration comprising:
   sending a request to a mobility management device to delete a user bearer of the user terminal.

10. The gateway device according to claim 7, wherein the triggering the user terminal to re-initiate the IMS registration comprising:
    sending a context message includes a list of proxy call session control function (P-CSCF) addresses to the user terminal.

11. The gateway device according to claim 7, wherein the triggering the user terminal to re-initiate the IMS registration comprising:
    releasing an IMS packet data network connection of the user terminal.

12. The gateway device according to claim 7, wherein the notification message is a Re-Auth-Request (RAR).

13. A method for recovering a called service of a user terminal comprising:
    receiving, by a policy and charging rules function device, a request for triggering the user terminal to re-initiate an IP Multimedia Subsystem (IMS) registration from a proxy-call session control function (P-CSCF) device;
    sending, by the policy and charging rules function device, a notification message to a gateway device, wherein the notification message is used to notify the gateway device to trigger the user terminal to re-initiate the IMS registration; and triggering, by the gateway device, the user terminal to re-initiate the IMS registration to recover the called service of the user terminal.

14. The method according to claim 13, wherein the notification message includes a proxy call session control function (P-CSCF) re-selection identifier, and the P-CSCF re-selection identifier is used to notify the gateway device to trigger the user terminal to re-initiate the IMS registration.

15. The method according to claim 13, wherein the triggering the user terminal to re-initiate the IMS registration comprising:

sending, by the gateway device, a request to a mobility management device to delete a user bearer of the user terminal.

16. The method according to claim 13, wherein the triggering the user terminal to re-initiate the IMS registration comprising:

sending, by the gateway device, a context message includes a list of proxy call session control function (P-CSCF) addresses to the user terminal.

17. The method according to claim 13, wherein the triggering the user terminal to re-initiate the IMS registration comprising:

releasing, by the gateway device, an IMS packet data network connection of the user terminal.

18. The method according to claim 13, wherein the notification message is a Re-Auth-Request (RAR) and the request is an authorization and authentication request (AAR).

19. A system for recovering a called service of a user terminal comprising:

a policy and charging rules function device and a gateway device, wherein the policy and charging rules function device comprises a processor and a non-transitory computer readable medium having computer executable instructions stored thereon which when executed by the processor cause the policy and charging rules function device to:

receive a request for triggering the user terminal to re-initiate an IP Multimedia Subsystem (IMS) registration from a proxy-call session control function (P-CSCF) device; and send a notification message to a gateway device, wherein the notification message is used to notify the gateway device to trigger the user terminal to re-initiate the IMS registration; and wherein the gateway device comprises a processor and a non-transitory computer readable medium having computer executable instructions stored thereon which when executed by the processor cause the gateway device to:

trigger the user terminal to re-initiate the IMS registration to recover the called service of the user terminal.

20. The system according to claim 19, wherein the notification message includes a proxy call session control function (P-CSCF) re-selection identifier, and the P-CSCF re-selection identifier is used to notify the gateway device to trigger the user terminal to re-initiate the IMS registration.

21. The system according to claim 19, wherein the gateway device is configured to:

send a request to a mobility management device to delete a user bearer of the user terminal.

22. The system according to claim 19, wherein the gateway device is configured to:

send a context message includes a list of proxy call session control function (P-CSCF) addresses to the user terminal.

23. The system according to claim 19, wherein the gateway device is configured to: release an IMS packet data network connection of the user terminal.

* * * * *